United States Patent
Bodin et al.

(10) Patent No.: US 8,781,830 B2
(45) Date of Patent: Jul. 15, 2014

(54) DIFFERENTIAL DYNAMIC CONTENT DELIVERY WITH TEXT DISPLAY IN DEPENDENCE UPON SIMULTANEOUS SPEECH

(71) Applicant: Nuance Communications, Inc., Burlington, MA (US)

(72) Inventors: William K. Bodin, Austin, TX (US); Michael J. Burkhart, Round Rock, TX (US); Daniel G. Eisenhauer, Austin, TX (US); Thomas J. Watson, Pflugerville, TX (US); Daniel M. Schumacher, Pflugerville, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/933,712

(22) Filed: Jul. 2, 2013

(65) Prior Publication Data

US 2014/0019129 A1 Jan. 16, 2014

Related U.S. Application Data

(63) Continuation of application No. 13/619,770, filed on Sep. 14, 2012, now Pat. No. 8,504,364, which is a continuation of application No. 12/055,240, filed on Mar. 25, 2008, now Pat. No. 8,332,220, which is a continuation of application No. 10/756,126, filed on Jan. 13, 2004, now Pat. No. 7,567,908.

(51) Int. Cl.

| | |
|---|---|
| G10L 15/26 | (2006.01) |
| G10L 13/00 | (2006.01) |
| G10L 15/01 | (2013.01) |
| G10L 15/04 | (2013.01) |
| G10L 15/08 | (2006.01) |
| G10L 19/00 | (2013.01) |
| G01L 19/04 | (2006.01) |
| G10L 19/08 | (2013.01) |
| G10L 17/22 | (2013.01) |
| G06F 17/30 | (2006.01) |
| H04N 1/00 | (2006.01) |
| G09B 1/00 | (2006.01) |

(52) U.S. Cl.
CPC .............. *G10L 13/00* (2013.01); *G10L 15/01* (2013.01); *G10L 15/04* (2013.01); *G10L 15/08* (2013.01); *G10L 19/00* (2013.01); *G01L 19/04* (2013.01); *G10L 19/08* (2013.01); *G10L 17/22* (2013.01); *G06F 17/30705* (2013.01); *H04N 1/00* (2013.01); *G09B 1/00* (2013.01)
USPC ........... 704/235; 715/727; 715/700; 715/234; 715/230; 715/202; 709/231; 709/204; 709/203; 707/5; 707/3; 704/275; 704/270; 704/260; 704/255; 704/246; 704/243; 704/239; 704/221; 704/200; 398/75; 370/260; 348/14.07

(58) Field of Classification Search
CPC ......... G10L 13/00; G10L 15/01; G10L 15/04; G10L 15/08; G10L 19/00; G10L 19/04; G10L 19/008; G10L 17/22; G06F 17/30705; G09B 10/00; G09B 1/00; H04N 1/00
USPC ......... 704/203, 235, 275, 200, 221, 239, 243, 704/246, 260, 270; 709/204, 203, 231; 707/3, 5; 715/202, 230, 234, 700, 727; 398/75; 370/260; 348/14.07

See application file for complete search history.

(56) References Cited

U.S. PATENT DOCUMENTS 5,333,275 A * 7/1994 Wheatley et al. ............. 704/243
5,995,936 A * 11/1999 Brais et al. .................... 704/275

(Continued)

*Primary Examiner* — Michael Colucci
(74) *Attorney, Agent, or Firm* — Wolf, Greenfield & Sacks, P.C.

(57) ABSTRACT

Differential dynamic content delivery including providing a session document for a presentation, wherein the session document includes a session grammar and a session structured document; selecting from the session structured document a classified structural element in dependence upon user classifications of a user participant in the presentation; presenting the selected structural element to the user; streaming presentation speech to the user including individual speech from at least one user participating in the presentation; converting the presentation speech to text; detecting whether the presentation speech contains simultaneous individual speech from two or more users; and displaying the text if the presentation speech contains simultaneous individual speech from two or more users.

20 Claims, 23 Drawing Sheets

(56) References Cited

U.S. PATENT DOCUMENTS

| | | | |
|---|---|---|---|
| 6,260,011 B1* | 7/2001 | Heckerman et al. | 704/235 |
| 6,477,491 B1* | 11/2002 | Chandler et al. | 704/235 |
| 6,535,848 B1* | 3/2003 | Ortega et al. | 704/235 |
| 6,748,361 B1* | 6/2004 | Comerford et al. | 704/275 |
| 6,829,603 B1* | 12/2004 | Chai et al. | 1/1 |
| 7,162,692 B2* | 1/2007 | Bodin et al. | 715/230 |
| 7,219,123 B1* | 5/2007 | Fiechter et al. | 709/203 |
| 7,243,060 B2* | 7/2007 | Atlas et al. | 704/200 |
| 7,287,221 B2* | 10/2007 | Bodin et al. | 715/202 |
| 7,295,970 B1* | 11/2007 | Gorin et al. | 704/221 |
| 2002/0003547 A1* | 1/2002 | Wang et al. | 345/727 |
| 2003/0050777 A1* | 3/2003 | Walker, Jr. | 704/235 |
| 2003/0071833 A1* | 4/2003 | Dantzig et al. | 345/700 |
| 2003/0120793 A1* | 6/2003 | Marjola | 709/231 |
| 2003/0208473 A1* | 11/2003 | Lennon | 707/3 |
| 2004/0064317 A1* | 4/2004 | Othmer et al. | 704/260 |
| 2004/0153504 A1* | 8/2004 | Hutchinson et al. | 709/204 |
| 2004/0172252 A1* | 9/2004 | Aoki et al. | 704/270 |
| 2004/0204939 A1* | 10/2004 | Liu et al. | 704/239 |
| 2005/0060153 A1* | 3/2005 | Gable et al. | 704/246 |
| 2005/0132273 A1* | 6/2005 | Bodin et al. | 715/513 |
| 2006/0277465 A1* | 12/2006 | Pandit et al. | 715/531 |

\* cited by examiner

Presentation document ~ 314

Presentation grammar (object) ~ 120
Structured document (object) ~ 122
Original document location (URI) ~ 202

User profile ~ 126

User name (string) ~ 204
Password (string) ~ 206
User grammar (object) ~ 208
User classifications (string array) ~ 210

Presentation session ~ 128

Presentation ID (string) ~ 212
Presenter ID (string) ~ 214
Participant list ID (string array) ~ 216
Schedule (date and time) ~ 218
Requested content (URI array) ~ 220
Filtered content (URI array) ~ 222
mergeGrammars (method) ~ 224

Agent ~ 110

Content type plug-ins (object array) ~ 114
Classification plug-ins (object array) ~ 116
createStructuredDocument (method) ~ 230

Content type plug-in ~ 114 createPresentationGrammar (method) ~ 232

Classification plug-in ~ 116 classifyDocument (method) ~ 234

FIG 2

| Full Grammar 308 |||||
| --- | --- | --- | --- | --- |
| Content Type 410 | Key Phrase 516 | Presentation Action Identifier 518 | Structural Element Identifier 318 | Parameter 520 |
| WP | page down | PgDn |  | null |
| WP | page up | PgUp |  | null |
| WP | go to page | goToPage |  | integer |
| WP | next paragraph | nextParagraph | <paragraph> | null |
| WP | go to heading | nextHeading | <heading> | string |
| WP | previous bullet | prevBullet | <bullet> | null |
| WP | go to subtitle | goToSubtitle | <subtitle> | string |

FIG 5

DIFFERENTIAL DYNAMIC CONTENT DELIVERY WITH TEXT DISPLAY IN DEPENDENCE UPON SIMULTANEOUS SPEECH

CROSS-REFERENCE TO RELATED APPLICATION

This application is a continuation application of and claims priority from U.S. patent application Ser. No. 13/619,770, filed on Sep. 14, 2012, which is a continuation of U.S. patent application Ser. No. 12/055,240, filed on Mar. 25, 2008, which is a continuation of U.S. patent application Ser. No. 10/756,126, filed on Jan. 13, 2004, each of which is incorporated herein by reference in its entirety.

BACKGROUND OF THE INVENTION

1. Field of the Invention

The field of the invention is data processing, or, more specifically, methods, systems, and products for differential dynamic content delivery with text display in dependence upon simultaneous speech.

2. Description of Related Art

Multimedia presentations through conferencing systems are becoming more common, but they are inflexible because all conference participants must be presented with exactly the same content. For any particular presentation, however, there is typically a wide variety of participant interest, company, group, or department membership, technical knowledge, security authorization, and so on, across almost any dimension in which participants may vary. Targeting content for such a heterogeneous set of users is typically a manual process today in which presenters create wholly separate presentations for each audience, and the content of each such presentation is reduced to the lowest common denominator of any particular audience. There is a substantial need for improved multimedia presentation systems.

SUMMARY OF THE INVENTION

Methods, systems, and products are disclosed that operate generally to support improved multimedia presentations by creating a presentation document that includes a content-specific presentation grammar and a structured document. The structured document typically has structural elements such as pages, paragraphs, cells, titles, and the like marked with structural identifiers. A content-specific presentation grammar ties presentation actions to the document structure through these structural element identifiers. A presentation actions directs the presentation of a document such as by moving the presentation to the next page of the document, the previous paragraph of the document and so on. A presentation grammar empowers a presenter to invoke the presentation actions using speech.

In typical embodiments, users are assigned classifications describing any attributes of a user, company name, department name, age, gender, technical knowledge, educational level, subject matters of personal interest, security authorization, and so on. Contents of structural elements from structured documents are then filtered for presentation to individual users in a multi-media, multi-user presentation according to the individual attributes of the participants.

In a presentation regarding marketing of a deep space vehicle for a Mars mission, for example, graphic images and paragraphs of text may be developed in many versions, inserted into the same presentation document with each version classified according to technical level, security level, and so on, so that a member of the marketing department viewing the same paragraph at the same time in the same presentation as a member of the research department will in fact be shown a different version of the paragraph. A graphic diagram of a subsystem presented to the marketer will be a simpler version than the one shown at the same time to the researcher.

More particularly, methods, systems, and computer program products are provided for differential dynamic content delivery including providing a session document for a presentation, wherein the session document includes a session grammar and a session structured document; selecting from the session structured document a classified structural element in dependence upon user classifications of a user participant in the presentation; presenting the selected structural element to the user; streaming presentation speech to the user including individual speech from at least one user participating in the presentation; converting the presentation speech to text; detecting whether the presentation speech contains simultaneous individual speech from two or more users; and displaying the text if the presentation speech contains simultaneous individual speech from two or more users.

In typical embodiments, presentation speech contains simultaneous individual speech from two or more users, and the embodiments include identifying a period of simultaneous speech. In such embodiments, displaying the text may include displaying presentation text for a presentation period longer than the period of simultaneous speech. In many embodiments, detecting whether the presentation speech contains simultaneous speech from two or more users is carried out by determining whether a period of individual speech from a first user overlaps a period of individual speech from another user.

In many embodiments, displaying the text further includes segregating display text. In many embodiments, segregating display text further includes segregating display text according to channel. In some embodiments, segregating display text further includes segregating display text according to user.

In many embodiments, selecting a classified structural element further includes selecting a classified structural element having an associated classification identifier that corresponds to the user classification. Some embodiments also include creating a session document from a presentation document including: identifying a presentation document for a presentation, the presentation document including a presentation grammar and a structured document having structural elements classified with classification identifiers; identifying a user participant for the presentation, the user having a user profile including user classifications; and filtering the structured document in dependence upon the user classifications and the classification identifiers. Many embodiments include filtering the presentation grammar, in dependence upon the extracted structural elements, into a session grammar in the session document.

Typical embodiments also include creating a presentation document, including: creating, in dependence upon an original document, a structured document including one or more structural elements; classifying a structural element of the structured document according to a presentation attribute; and creating a presentation grammar for the structured document, wherein the presentation grammar for the structured document includes grammar elements each of which includes an identifier for at least one structural element of the structured document. In many embodiments, classifying a structural element includes: identifying a presentation attribute for the structural element; identifying a classification identifier in dependence upon the presentation attribute; and inserting the classification identifier in association with the structural element in the structured document. In typical embodiments, creating a presentation grammar for the structured document includes: identifying the content type of the original document; selecting, in dependence upon the content type, a full presentation grammar from among a multiplicity of full presentation grammars; and filtering the full presentation grammar into a presentation grammar for the structured document in dependence upon the structural elements of the structured document.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 sets forth class diagrams for exemplary object oriented classes useful in implementing methods and systems for creating presentation documents according to various exemplary embodiments of the present invention.

FIG. 5 sets forth an exemplary data structure in which a full grammar may be implemented according to embodiments of the present invention.

DETAILED DESCRIPTION OF EXEMPLARY EMBODIMENTS

Introduction

The present invention is described to a large extent in this specification in terms of methods for differential dynamic content delivery with text display in dependence upon simultaneous speech. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Creating a Presentation Document

Figure 1:
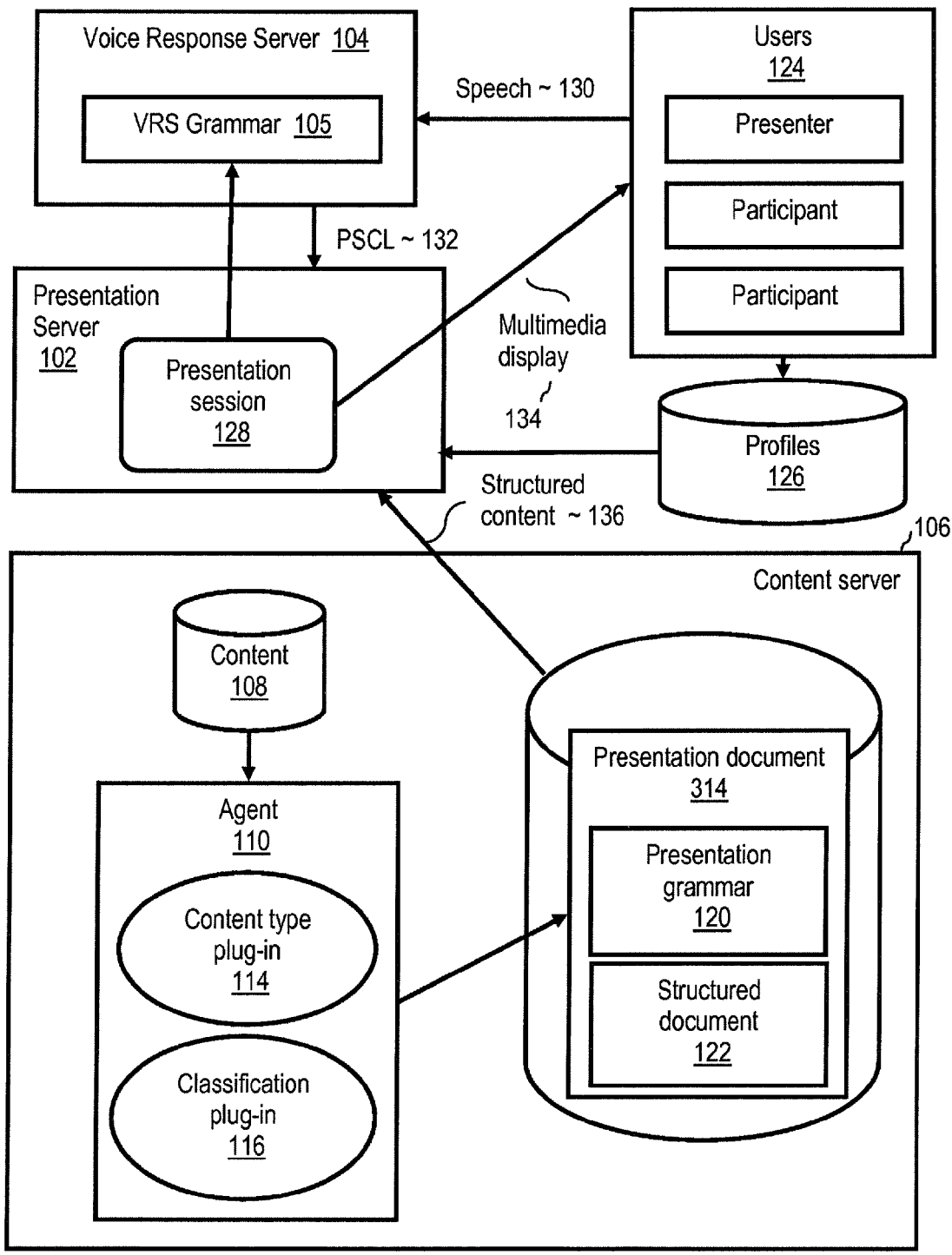
FIG. 1 sets forth a block diagram of an exemplary system architecture in which may be implemented various exemplary embodiments of the present invention.

Methods, systems, and products are now described for creating a presentation document with reference to the accompanying drawings, beginning with FIG. 1. FIG. 1 sets forth a block diagram of an exemplary system architecture in which may be implemented various exemplary embodiments of the present invention. The system of FIG. 1 include a content server (106) having stored content (108) of original documents from which presentation documents are created. Agent (110) includes software modules for creating presentation grammars for presentation documents according to content type (114) and for classifying presentation document content according to presentation attributes (116). Presentation attributes are generic selection criteria for displaying appropriate structural elements of original documents to users. Examples of presentation attributes include users' company names, department names, security levels, technical levels, and so on. User profiles (126) include user classification information typically used to filter presentation media according to presentation attributes.

Content server (106) includes storage for presentation documents (314) each of which is composed of a presentation grammar (120) and a structured document (122). A presentation grammar is a data structure that includes a set of key phrases used to identify presentation action identifiers and optional parameters for use in formulating presentation control instructions relevant to structural elements of a content type. In typical embodiments, presentation control instructions are represented by and formulated from presentation action identifiers (reference 518 on FIG. 5). Key phrases are spoken by users and presented as speech input to voice response server (104) where they are parsed and used to select a presentation action identifier (518 on FIG. 5) from a VRS grammar (105). VRS grammar (105) is formed dynamically from presentation grammars (120) in use in a presentation session (128). In some embodiments, VRS grammar (105) is formed dynamically from user grammars from user profiles (126). Presentation Session Control Language ("PSCL") stream (132) represents a stream of presentation control instructions composed of presentation action identifiers (518 on FIG. 5) and optional presentation control parameters (520 on FIG. 5) from VRS (104) to presentation server (102) which is programmed to present (134) structured multimedia content (136) from structured documents (122) to users (124) in accordance with such presentation control instructions (132).

FIG. 2 sets forth class diagrams for exemplary object oriented classes useful in implementing methods and systems for creating presentation documents according to various exemplary embodiments of the present invention. FIG. 2 includes a presentation document class (314) that includes a reference to a presentation grammar (120), a reference to a structured document (122), and a network location (202) of an original document from which the presentation document was created. In the example of FIG. 2, the network location (202) of the original document is expressed as a Uniform Resource Identifier or "URI."

FIG. 2 includes a profile class (126) whose objects represent presentation users. The profile class (126) includes a user name (204), a password (206), and a reference to a user grammar (208). A user grammar is a data structure that includes a set of key phrases that are used to select presentation action identifiers specific to a user for use in formulating presentation control instructions. For a presentation control instruction that instructs a presentation session to carry out the presentation action 'page down,' for example, an individual user may chose to associate with that presentation control instruction the key phrase "rock and roll" or "boogie on down" or any other key phrase favored by a user as will occur to those of skill in the art. Although these particular examples are somewhat fanciful, in fact, user grammars serve a useful purpose by providing key phrases for presentation control instructions that distinguish normal speech. In a discussion of a word processing document, for example, references to pages and paragraphs may abound, and using a distinctive phrase to invoke presentation control instructions on pages and paragraphs reduces the risk of confusion on the part of a voice response server and a presentation session.

The profile class (126) also includes a string array storing user classifications (210). Examples of user classifications (210) include any supported data codes describing users, including, for example "company=IBM," "department=marketing," "technical level=3," "security level=2," and others as will occur to those of skill in the art.

FIG. 2 includes a presentation session class (128) whose objects represent presentation sessions. A presentation session represents an aggregation of presentation documents for presentation usually at a set date and time, for a defined set of users including a presenter in charge. The presentation session class (128) includes a presentation identifier code (212), a presenter identification (214), a list of participants (216). The presentation session class (128) also includes a schedule date and time (218) when a presentation is to be presented, a URI array identifying presentation documents (220) requested by a presenter for a presentation session, a URI array identifying presentation documents that have been filtered according to presentation attributes or user classifications (220). The presentation session class (128) also includes a member method named mergeGrammars( ) (224) that is programmed to read presentation grammars from presentation documents and store them in a VRS grammar on a voice response server for use in parsing key phrases spoken by a presenter and other users into presentation control instructions.

Agent (110) includes software modules for structuring a presentation document according to content type (114) and for classifying presentation document content according to presentation attributes (116).

FIG. 2 includes an exemplary agent class (110) whose objects are used in content servers to create presentation documents. Agent class (110) includes an array of references to content type plug-ins (114) that are used to create presentation grammars for presentation documents according to content type. FIG. 2 also shows a content type plug-in class (114) with a member method named createPresentationGrammar( ) (232) which in this example is programmed to create presentation grammars for presentation documents according to content type. Agent class (110) also includes an array of references to classification plug-ins (116) that are used to classify presentation document content according to presentation attributes (116). FIG. 2 also shows a classification plug-in class (116) with a member method named classifyDocument( ) (234) which in this example is programmed to classify presentation document content according to presentation attributes.

Agent class (110) also includes a member method named createStructuedDocument( ) (232) which is programmed to convert an original document into a structured document by inserting structural element identifiers. Examples of structural element identifiers include , <paragraph>, <row>, <column>, <cell>, <slide>, <jpeg>, <title>, <heading>, <subheading>, and so on, as will occur to those of skill in the art. These examples of structural elements identifiers are expressed as markup tags such as would be used, for example, in a markup language such as HTML ("HyperText Markup Language") or XML ("eXtensible Markup Language"), although this is not a limitation of the invention. In fact, it is well within the scope of the present invention to implement structural element identifiers with binary codes, Unicode identifiers, or by use of other structure identifiers as will occur to those of skill in the art.

Figure 3:
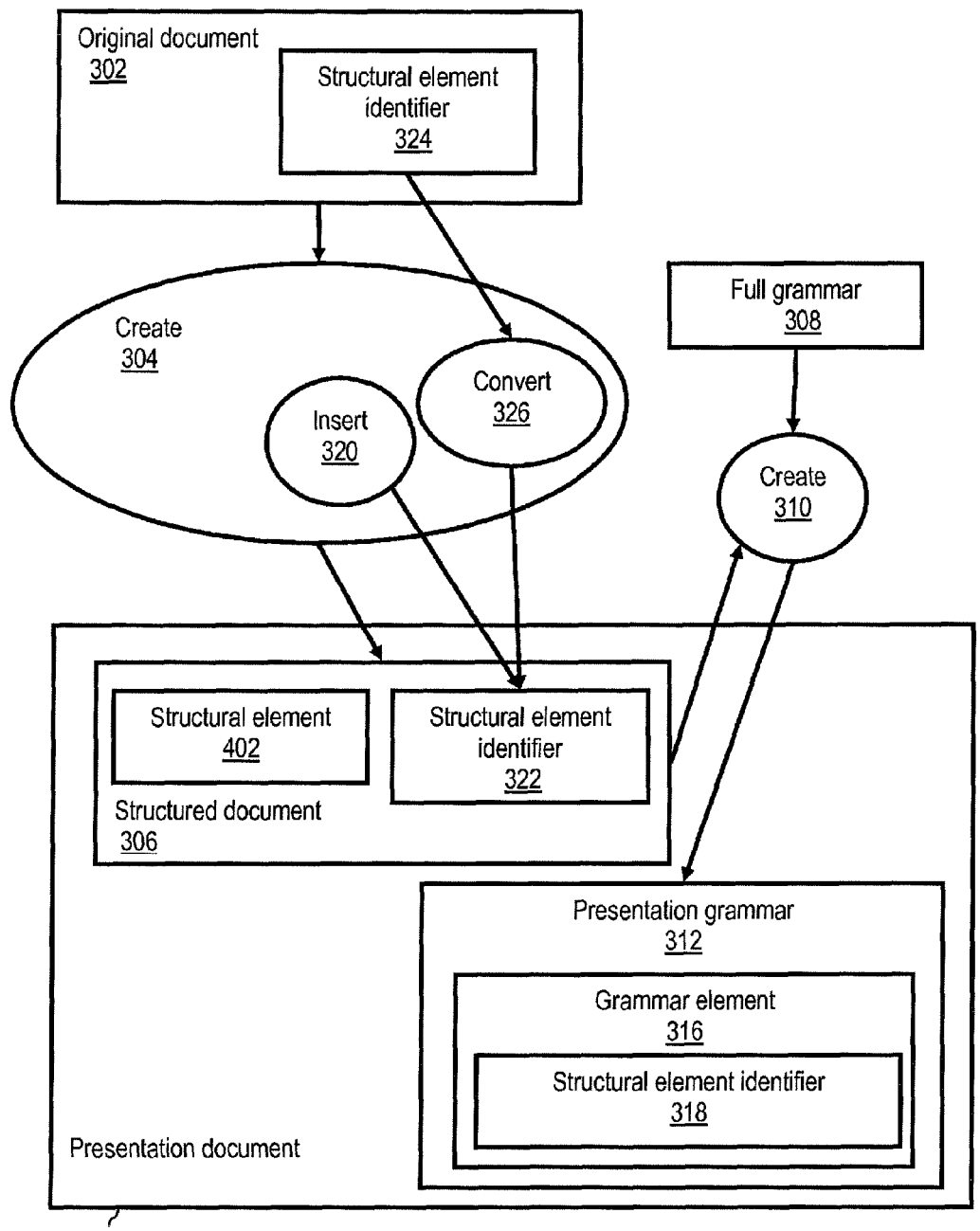
FIG. 3 sets forth a data flow diagram illustrating a method for creating a presentation document.

FIG. 3 sets forth a data flow diagram illustrating a method for creating a presentation document (314) that includes creating (304), in dependence upon an original document (302), a structured document (306) comprising one or more structural elements (402). In the method of FIG. 3, creating (304) a structured document (306) is carried out by inserting (320) in the structured document (306) structural element identifiers (322) for the structural elements (402). An alternative method of creating a structured document, also shown in FIG. 3, is carried out by converting (326) existing structural element identifiers (324) from the original document (302) to structural element identifiers (322) for the structural elements (402) of the structured document (306). The method of FIG. 3 also includes creating (310) a presentation grammar (312) for the structured document (306). In the example of FIG. 3, the presentation grammar (312) for the structured document (306) includes grammar elements (316) each of which includes a structural element identifier (318) for at least one structural element (402) of the structured document (306).

Figure 4:
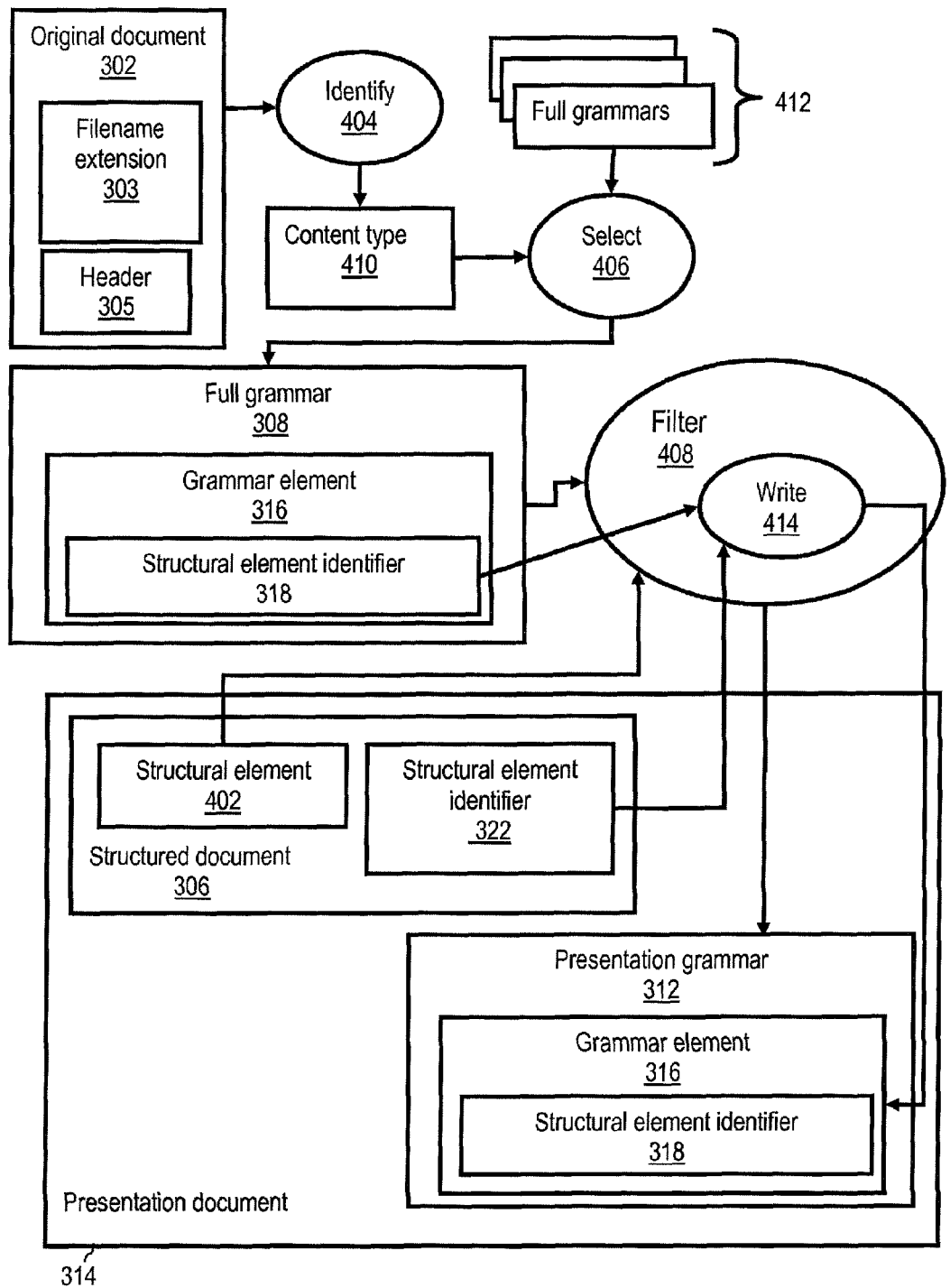
FIG. 4 sets forth a data flow diagram illustrating an exemplary method of creating a presentation grammar.

FIG. 4 sets forth a data flow diagram illustrating an exemplary method of creating a presentation grammar (312) for a structured document (314) that includes identifying (404) the content type (410) of the original document (302). Identifying the content type may be carried out, for example, by identifying the content type in dependence upon a filename extension (303) in the filename of an original document. Examples of filename extension identifying content type include 'pdf' for Adobe's Portable Document Format, 'xls' for a Microsoft Excel spreadsheet, 'doe' for a word processing document, 'xml' for an XML document, and so on, as will occur to those of skill in the art. Alternatively, identifying the content type may be carried out by identifying the content type in dependence upon document header elements in an original document (302). The following is an example of an HTML header identifying an original document having content type HTML version 4.01:

```
<!DOCTYPE HTML PUBLIC "-//W3C//DTD HTML 4.01//EN"
"http://www.w3.org/TR/html4/strict.dtd">
```

The method of FIG. 4 includes selecting (406), in dependence upon the content type (410), a full presentation grammar (308) from among a multiplicity of full presentation grammars (412). A full presentation grammar may be implemented, for example, as shown in FIG. 5. A multiplicity of full presentation grammars may be implemented in a data structure similar to the one shown in FIG. 5 by adding a content type column. FIG. 5 sets forth an exemplary data structure (308) in which a full grammar may be implemented according to embodiments of the present invention. The full grammar of FIG. 5 includes several grammar elements (502-514) for a content type. In this example, the content type is taken as a word processing document having structural elements that include pages, paragraphs, bullets, titles, subtitles, and so on, and the data structure includes a column for an identifier (318) of a structural element, a column for a key phrase (516) for formulating a presentation control instruction for invoking a presentation action, and a column for a presentation action identifier (518) representing a presentation action. The exemplary data structure of FIG. 5 also includes a column for a data indication whether a presentation control instruction requires a parameter. The exemplary grammar entries for presentation action identifiers PgDn (502), PgUp (504), nextParagraph (508), and prevBullet (512) have parameter (520) values of 'null,' signifying that a voice response server parsing their key phrases into presentation control instructions is not to parse a parameter for a presentation control instruction. The exemplary grammar entries for presentation action identifiers goToPage (506), nextHeading (510), and goToSubtitle (514), however, have parameter (520) values of 'integer' and 'string,' signifying that a voice response server parsing their key phrases into presentation control instructions is to seek to parse for each of them respectively an integer parameter, a string parameter, and a string parameter.

The method of FIG. 4 includes filtering (408) the full presentation grammar (308) into a presentation grammar (312) for the structured document (306) in dependence upon the structural elements (402) of the structured document (306). Filtering (408) the full presentation grammar (308) may be carried out by writing (414) from the full presentation grammar (308) to the presentation grammar (312) for the structured document (306) each grammar element (316) having a structural element identifier (318) of a structural element (402) that occurs in the structured document (306). Using the exemplary full grammar of FIG. 5, for example, to create a presentation grammar for a structured document having structural elements including pages, paragraphs, headings, and subtitles but no bullet points identified in it as structural elements, filtering (408) the full presentation grammar (308) by writing (414) to the presentation grammar (312) grammar elements (502-510) plus grammar element (514) but excluding grammar element (512).

Methods of creating presentation documents are further explained with an exemplary use case. Consider the following example of a structured document:

```
<document>

<p id="1">a paragraph</p>
        <p id="2">another paragraph</p>
        <image id="1">a graphic image</image>

<p id="3">a paragraph</p>
        <p id="4">another paragraph</p>
        <image id="2">another graphic image</image>

</document>
```

And assume that this exemplary structured document is associated in a presentation document with the following presentation grammar:

TABLE 1

Presentation Grammar

| Key Phrase | Presentation Action Identifier | Structural Element Identifier | Parameter |
| --- | --- | --- | --- |
| page down | PgDn |  | null |
| page up | PgUp |  | null |
| go to page | goToPage |  | integer |
| next paragraph | nextParagraph | <p> | null |
| go to paragraph | goToParagraph | <p> | integer |
| next image | nextImage | <image> | null |
| go to image | goToImage | <image> | integer |

This example is discussed with reference to the exemplary system architecture of FIG. 1. In this example, then, when a presentation session (128) displays the first page of the structured document and a user (124) speaks the words "page down," a voice response server (104), having this presentation grammar as part of its VRS grammar (105), parses the speech into a presentation control instruction having a presentation control identifier named "PgDn" and communicates the presentation control instruction through a presentation interface (132) to the presentation session in presentation server (102) which then displays the next page, in this example, page 2 of the example structured document. Similarly, when the first page of the structured document is on display, a user's speaking the words "go to paragraph 4" results in the presentation session's changing the display to show paragraph 4 on the second page of the document. And, when the first page is on display for the users participating in the presentation and a user speaks the words "next image," the presentation session changes the display to show image 2 on the second page of the document.

Classifying Structure Elements in a Presentation Document

Figure 6:
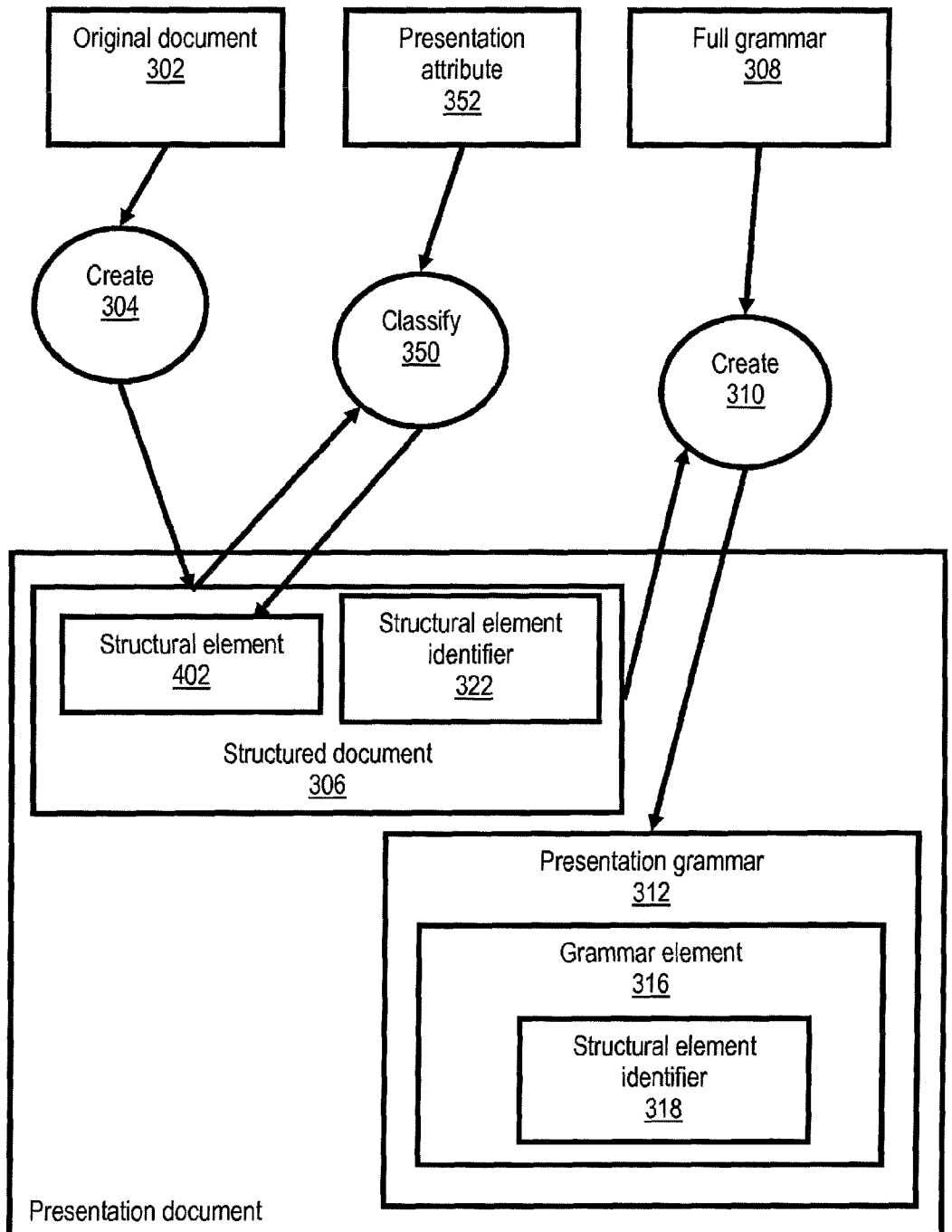
FIG. 6 is a data flow diagram illustrating a further method for creating a presentation document.
Figure 7:
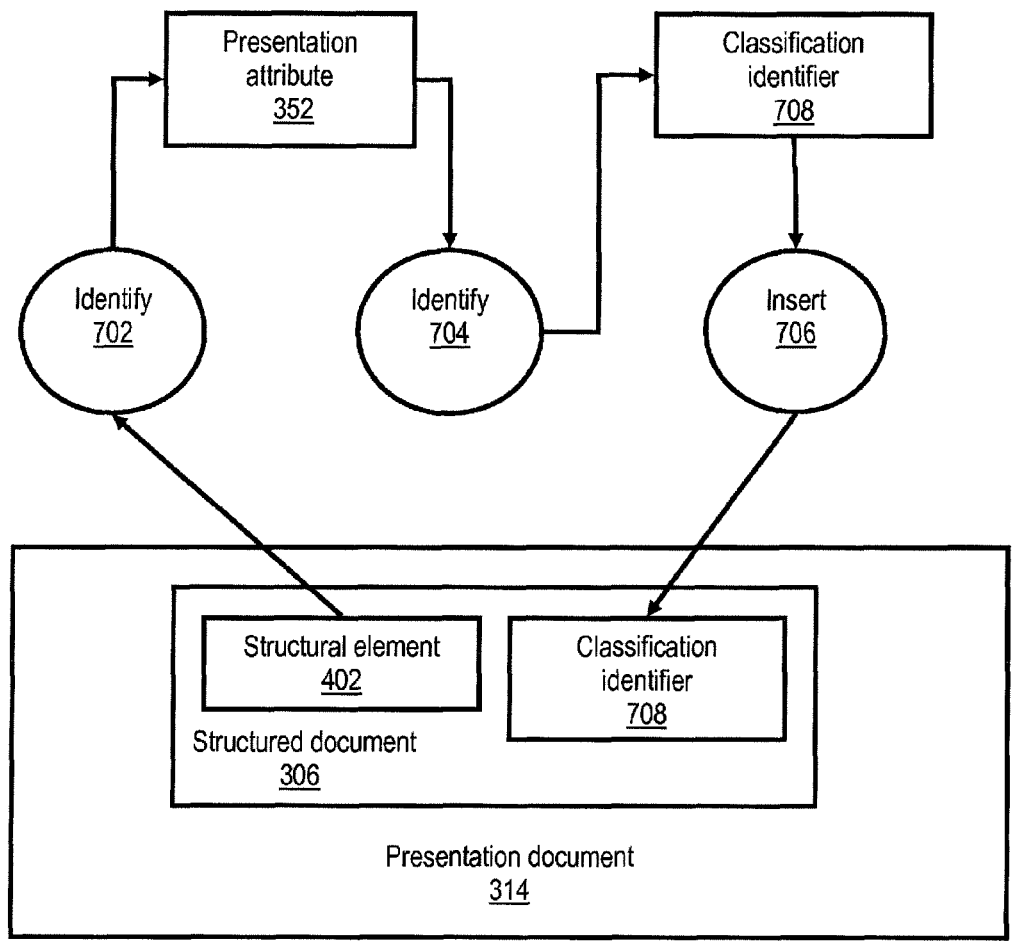
FIG. 7 is a data flow diagram illustrating an exemplary method for classifying a structural element.

FIG. 6 is a data flow diagram illustrating a further method for creating a presentation document (314). The method of FIG. 6 includes creating (304), in dependence upon an original document (302), a structured document (306) comprising one or more structural elements (402), as explained in detail above. The method of FIG. 6 also includes classifying (330) a structural element (402) of the structured document (306) according to a presentation attribute (352). FIG. 7 is a data flow diagram illustrating an exemplary method for classifying a structural element that includes identifying (702) a presentation attribute (352) for the structural element (402); identifying (704) a classification identifier (708) in dependence upon the presentation attribute (352); and inserting (706) the classification identifier (708) in association with the structural element (402) in the structured document (306). The method of FIG. 6 also includes creating (310) a presentation grammar (312) for the structured document (306), wherein the presentation grammar (312) for the structured document (306) includes grammar elements (316) each of which includes an identifier (318) for at least one structural element (402) of the structured document (306).

Figure 8:
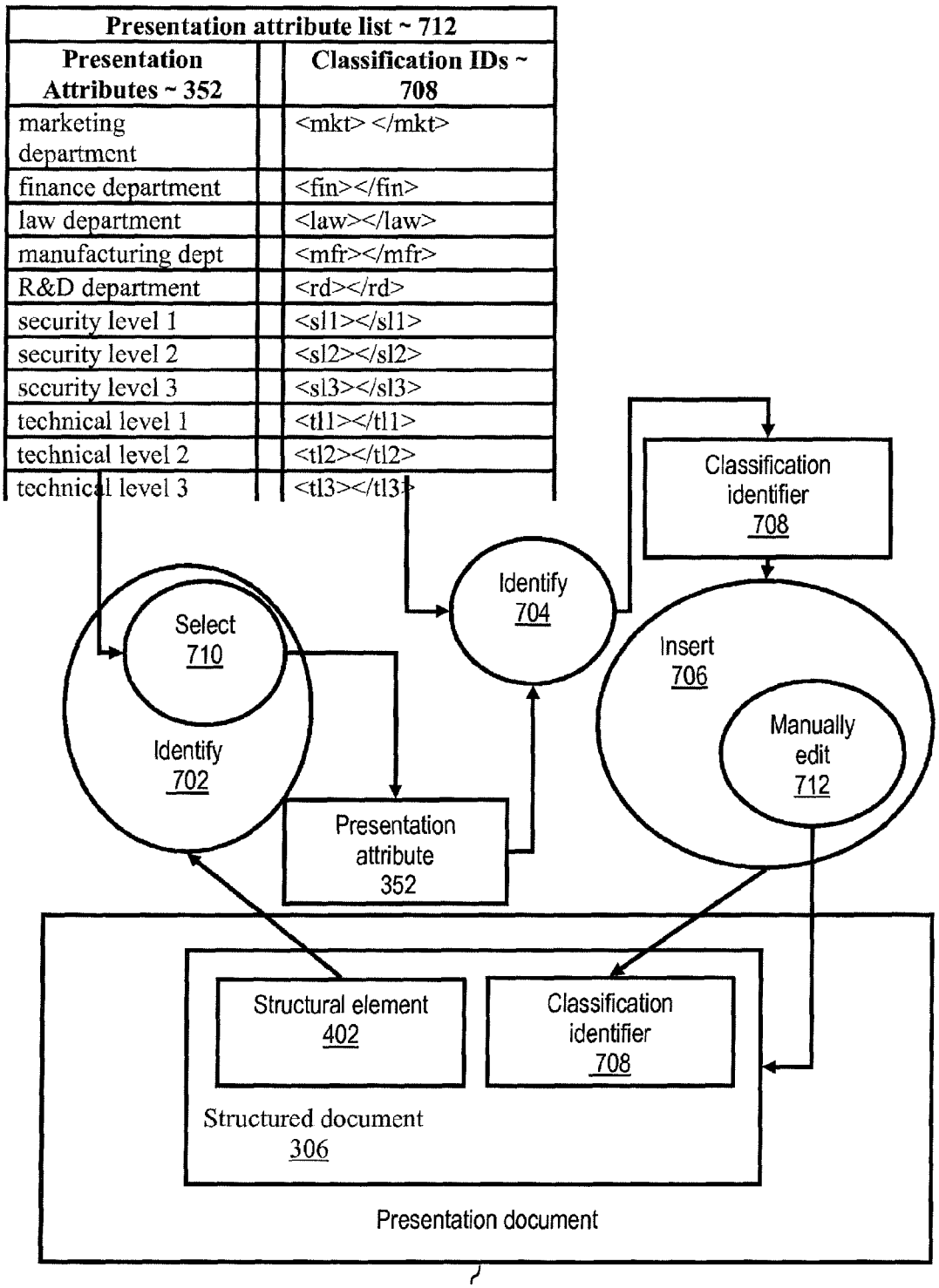
FIG. 8 sets forth a data flow diagram illustrating an exemplary method for classifying a structural element in a structured document.

FIG. 8 sets forth a data flow diagram illustrating an exemplary method for classifying a structural element in a structured document in which identifying (702) a presentation attribute (352) for the structural element (402) includes selecting (710) a presentation attribute (352) from a list (712) of supported presentation attributes (352). The presentation attribute list (712) of FIG. 8 includes two columns, one column for presentation attributes (352) and another column for associated classification identifiers (708). In the method of FIG. 8, identifying (704) a classification identifier (708) is carried out by identifying a classification identifier (708) associated with the presentation attribute (352) on the list (712). In the method of FIG. 8, inserting (706) the classification identifier (708) includes manually editing (712) the structured document (306) to insert classification identifiers in appropriate locations to classify structural elements in a structured document. For example, a paragraph to be viewed only by members of the marketing department may be classified by tagging the paragraph with <mkt></mkt>.

Figure 9:
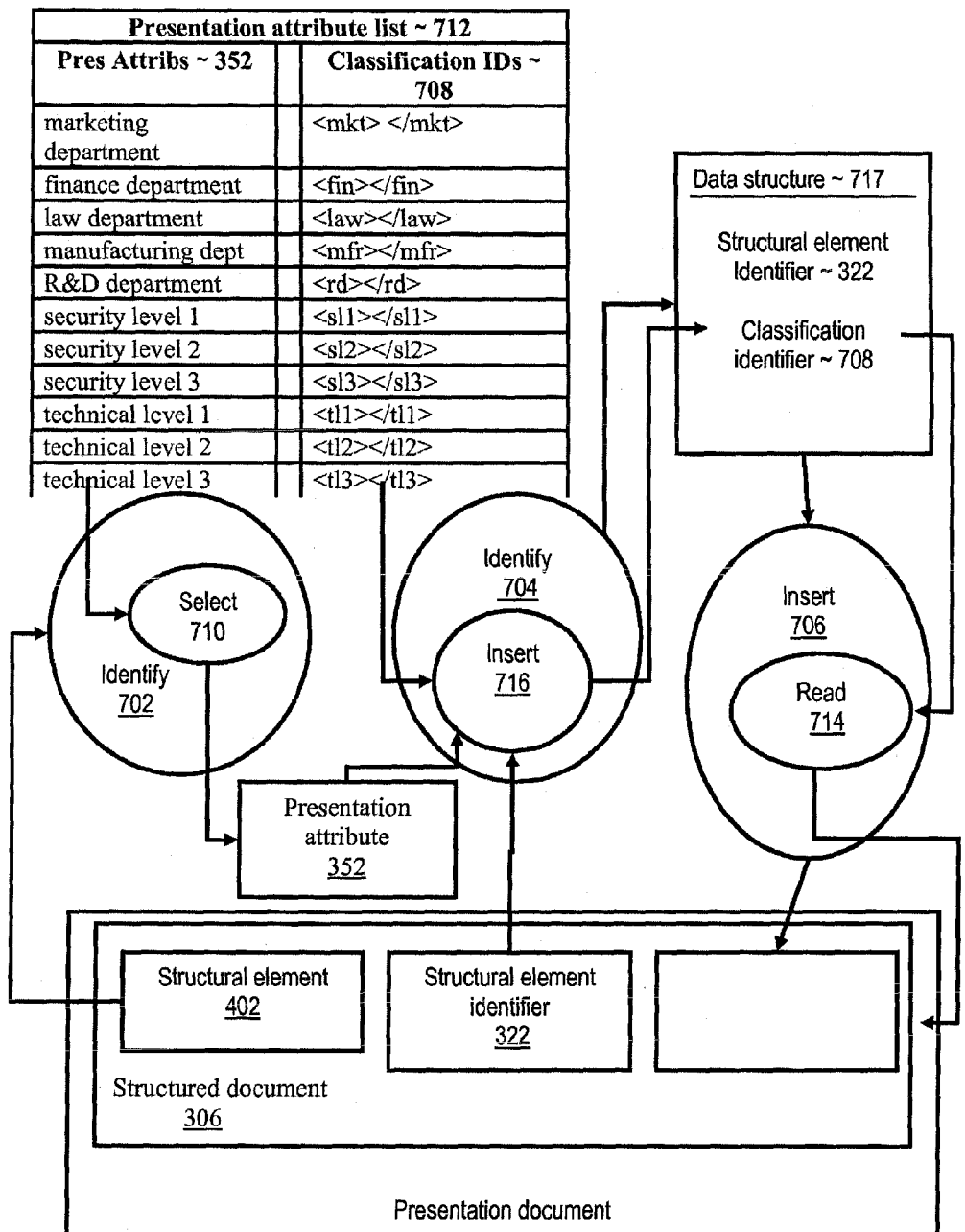
FIG. 9 sets forth a data flow diagram illustrating a further exemplary method for classifying a structural element in a structured document.

FIG. 9 sets forth a data flow diagram illustrating a further exemplary method for classifying a structural element in a structured document in which identifying (702) a presentation attribute (352) for the structural element (402) includes selecting (710) a presentation attribute (352) from a list (712) of supported presentation attributes (352), the presentation attribute (352) having an associated classification identifier (708). In the method of FIG. 9, identifying (704) a classification identifier (708) includes inserting (716) the classification identifier (708) in a data structure (717) in association with a structural element identifier (322) for the structural element (402). In the method of FIG. 9, inserting (706) the classification identifier (708) in the structured document (306) includes reading (714) the classification identifier (708) from the data structure (717) in dependence upon the structural element identifier (322).

Figure 10:
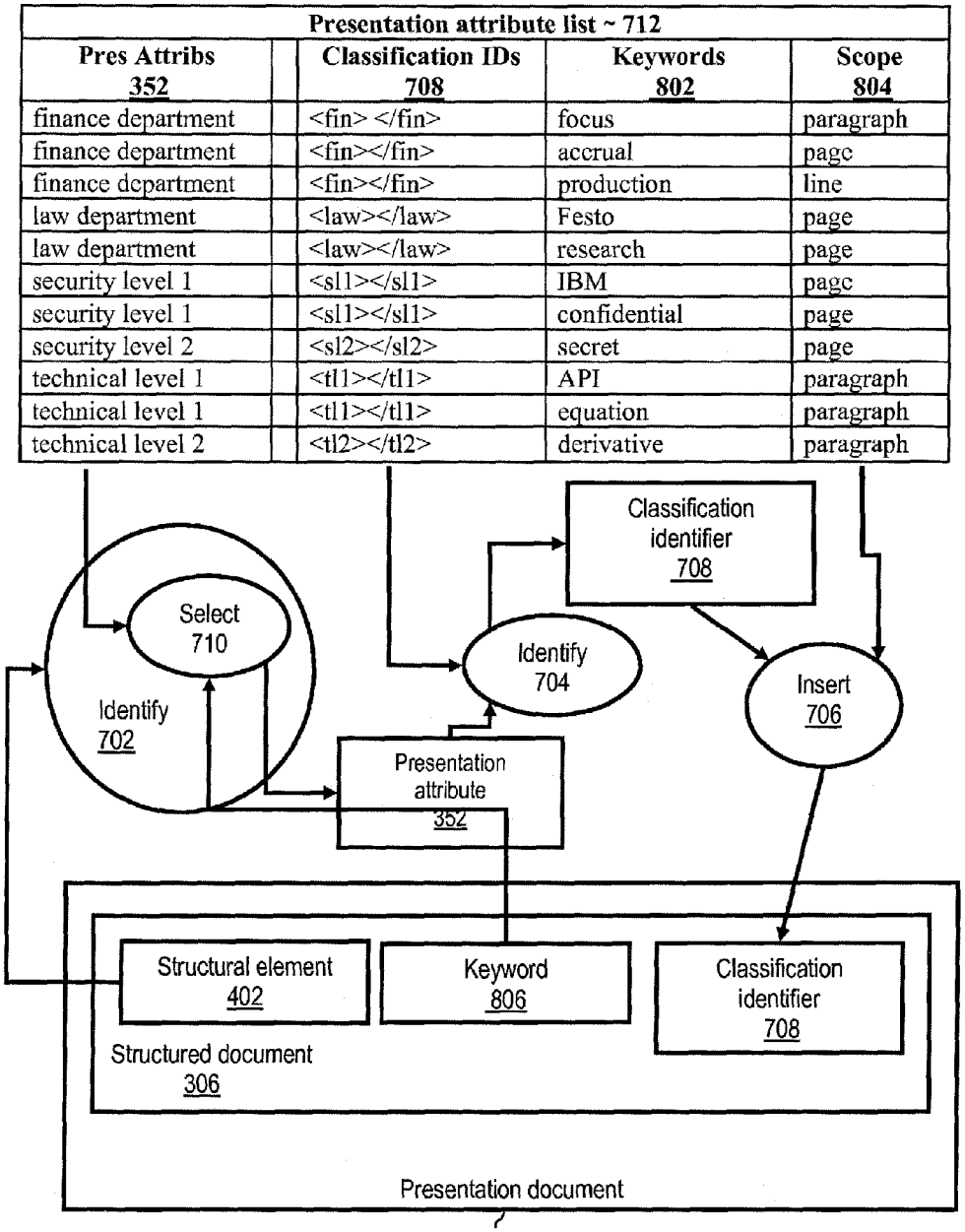
FIG. 10 sets forth a data flow diagram illustrating another exemplary method for classifying a structural element in a structured document.

FIG. 10 sets forth a data flow diagram illustrating another exemplary method for classifying a structural element in a structured document that includes providing a list (712) of supported presentation attributes (352) including at least one keyword (802) and at least one indication of structural insertion scope (804) for each presentation attribute (352). In the method of FIG. 10, identifying (702) a presentation attribute (352) for the structural element (402) includes selecting (710) a presentation attribute (352) from the list (712) in dependence upon a keyword (806) from the structured document (306). In the method of FIG. 10, identifying (704) a classification identifier (708) is carried out by identifying a classification identifier (708) associated with the presentation attribute (352) on the list (712). In the method of FIG. 10, inserting (706) the classification identifier (708) is carried out by inserting the classification identifier (708) in the structured document (306) according to a structural insertion scope (804) for the selected presentation attribute (352).

Figure 11:
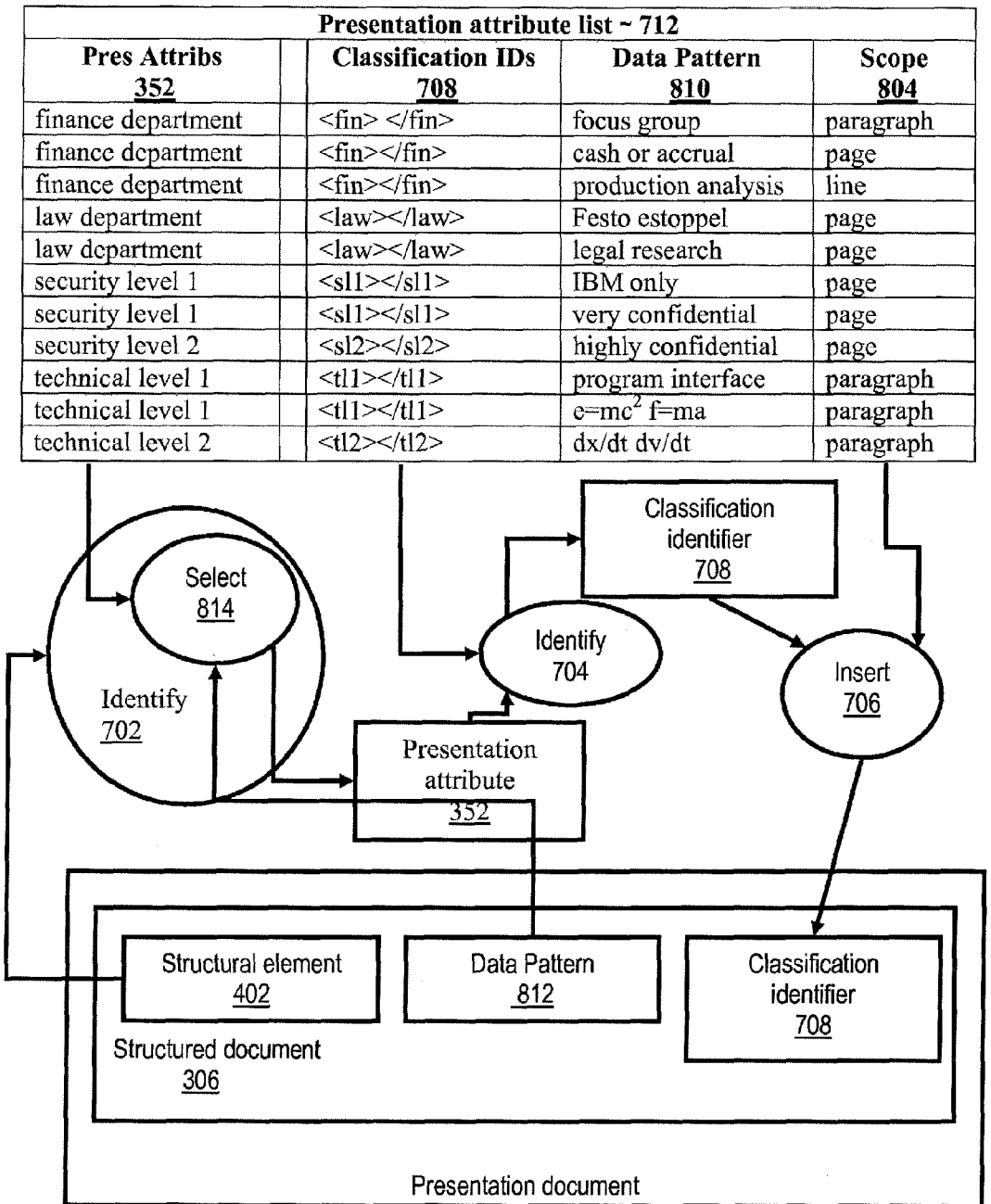
FIG. 11 sets forth a data flow diagram illustrating a further exemplary method for classifying a structural element in a structured document.

FIG. 11 sets forth a data flow diagram illustrating a further exemplary method for classifying a structural element in a structured document that includes providing a list (712) of supported presentation attributes (352) including at least one data pattern (810) and at least one indication of structural insertion scope (804) for each presentation attribute (352). In the method of FIG. 11, identifying (702) a presentation attribute (352) for the structural element (402) includes selecting (814) a presentation attribute (352) from the list (712) in dependence upon a data pattern (812) from the structured document (306). In the method of FIG. 11, identifying (704) a classification identifier (708) is carried out by identifying a classification identifier (708) associated with the presentation attribute (352) on the list (712). In the method of FIG. 11, inserting (706) the classification identifier (708) is carried out by inserting the classification identifier (708) in the structured document (306) according to a structural insertion scope (804) for the selected presentation attribute (352).

Methods of creating presentation documents are further explained with an exemplary use case. Consider the following example of a structured document:

```
<document>

<p id="1">
            a paragraph on an introductory subject
        </p>

<p id="2">
            a paragraph on a particular subject
        </p>
        <tech level="2">
        <p id="2">
            a more technical paragraph on the same subject
        </p>
        </tech>
        <security level="2">
        <p id="2">
            a more secret paragraph on the same subject
        </p>
        </security>
        <dept id="marketing">
        <p id="2">
            a paragraph on the same subject with added detail
            regarding marketing
        </p>
        </dept>
```

```
        <company id="IBM">
        <p id="2">
            a paragraph on the same subject with added detail
            pertinent to a user's company
        </p>
        </company>
        <p id="3">
            a paragraph on a further subject
        </p>
        ... ... ...

... ... ...

... ... ...
</document>
```

This example is discussed with reference to the exemplary system architecture of FIG. 1, assuming that this exemplary structured document is associated in a presentation document with a presentation grammar that includes presentation action identifiers for paragraphs and pages uploaded to a VRS grammar (105) in a voice response server (104). In this example, then, when a presentation session (128) is displaying the first page of the structured document and a user (124) speaks the words "next page," a voice response server (104) parses the speech into a presentation control instruction with a presentation action identifier named "PgDn" and communicates the presentation control instruction through a presentation interface (132) to the presentation session which then displays the next page, in this example, page 2 of the example structured document. Assume that there are five users (124) registered as participants with the presentation session (128), and note that there are five different versions of paragraph 2 on page two of the structured document.

In this example, a first version of paragraph 2 bears a structural identifier <p></p> identifying it as a paragraph, but this first version of paragraph 2 bears no classification identifier. In this example, presentation session (128) is programmed to display this unclassified version of paragraph 2 to users having either the lowest technical classifications, the lowest security classifications, or no particular technical or security classifications at all. Moreover, in an example, where there were only one version of paragraph 2, all users would be presented with that one version.

In this example, a second version of paragraph 2 is classified with a classification identifier <tech level="2">. In this example, presentation session (128) is programmed to display this second version of paragraph 2 to users having user classification indicating technical level 2. That is, when a user having technical level 2 in the user's profile classifications (210 on FIG. 2) is registered with the presentation session, upon being directed to display paragraph 2, rather than displaying an unclassified version of paragraph 2, the presentation session displays the second version of paragraph 2 classified <tech level="2"> to such a user.

Similarly, a user having a user profile classification representing a heightened security authorization, security level 2, is shown the version of paragraph 2 classified by the classification identifier <security level="2">. A user having a user profile classification identifying the user as a member of the marketing department is shown the version of paragraph 2 classified by the classification identifier <dept id="marketing">. A user having a user profile classification identifying the user as an employee of IBM is shown the version of paragraph 2 classified by the classification identifier <company id="IBM">.

For purposes of clarity of explanation, the structural elements in this example are shown with only one classification per element. Persons of skill in the art will recognize, however, that it is well within the scope of the present invention for a structural element of a structured document to be classified with any number of classification identifiers.

Creating a Voice Response Grammar from a Presentation Grammar

Figure 12:
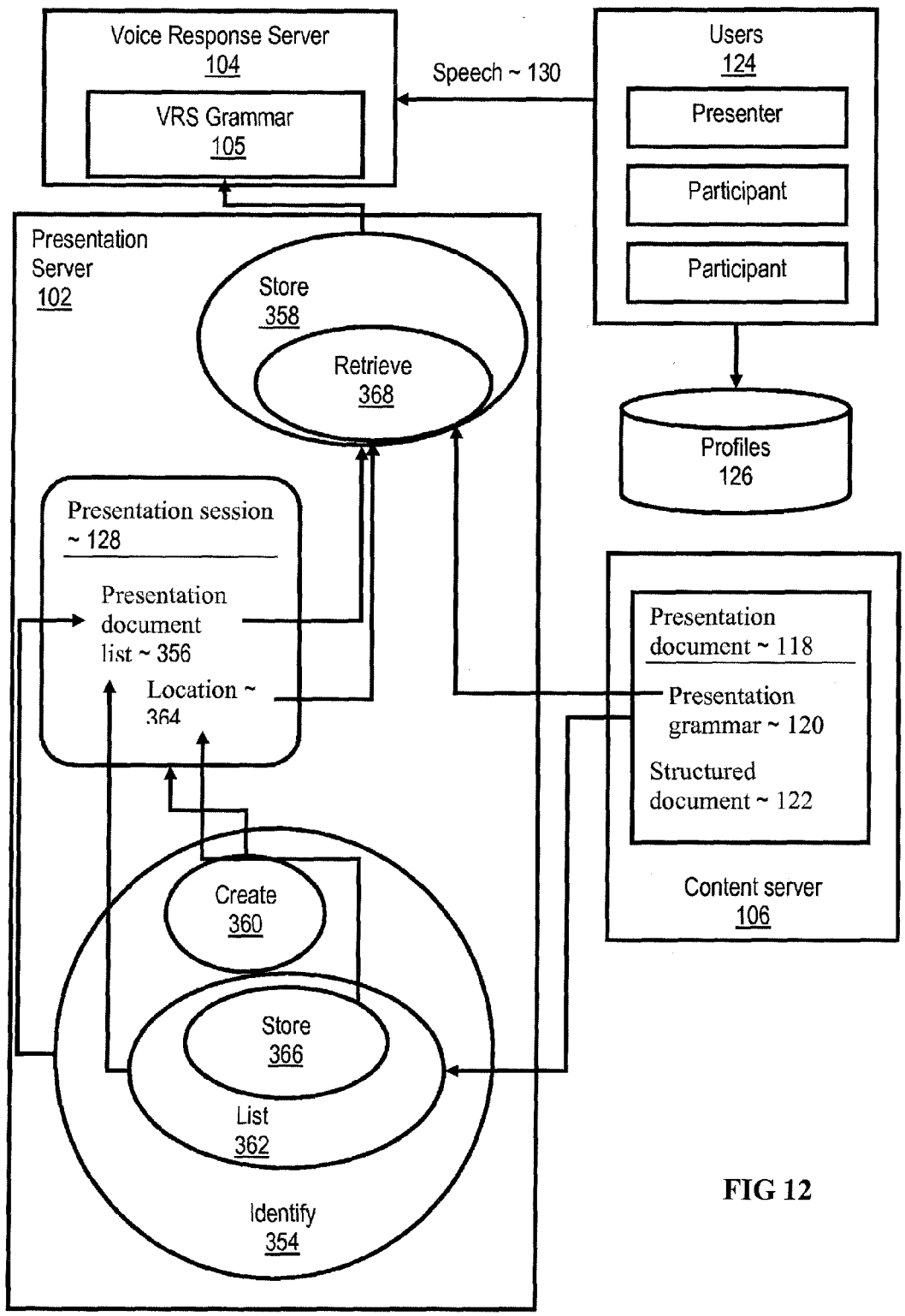
FIG. 12 sets forth a data flow diagram illustrating an exemplary method for creating a voice response grammar in a voice response server.

FIG. 12 sets forth a data flow diagram illustrating a method for creating a voice response grammar in a voice response server including identifying (354) presentation documents (118) for a presentation. In the method of FIG. 4, each presentation document has a presentation grammar (120), and the method includes storing (358) each presentation grammar (120) in a voice response grammar (105) on a voice response server (104). Presentation grammars and voice response grammars may be structured like the full grammars illustrated in FIG. 5 with grammar elements (502-514) for a content type (410). In the exemplary grammar structure of FIG. 5, the content type is taken as a word processing document having structural elements that include pages, paragraphs, bullets, titles, subtitles, and so on, and the data structure includes a column for an identifier (318) of a structural element, a column for a key phrase (516) for formulating a presentation control instruction to invoke a presentation action, and a column for a presentation action identifier (518) representing a presentation action.

In the method of FIG. 12, identifying (354) presentation documents (118) for a presentation includes creating (360) a data structure (128) representing a presentation and listing (362) at least one presentation document (118) in the data structure (128) representing a presentation. A data structure representing a presentation may be implemented as an instance of a presentation session class as shown at reference (128) on FIG. 2. In the method of FIG. 12, listing (362) the at least one presentation document (118) includes storing (366) a location (364) of the presentation document (118) in the data structure (128) representing a presentation. In the exemplary structure of FIG. 2, storing a location of a presentation document may be implemented by storing presentation document locations in the form of URIs in an array of URIs (220). In the method of FIG. 12, storing (358) each presentation grammar (120) includes retrieving (368) a presentation grammar (120) of the presentation document (118) in dependence upon the location (364) of the presentation document (118).

In one exemplary embodiment of the method of FIG. 12, the presentation document (118) is implemented as a file in a file system on a content server (106) and the file has a location (364) identified by a pathname. In such an embodiment, storing (366) a location (364) of the presentation document (118) in the data structure (128) representing a presentation includes storing the pathname and a network location of the content server. An example of storing a pathname and a network location is storing a URI for the document in a URI array such as that illustrated at reference (220) on FIG. 2. Such a URI may have the form:

http://www.someContentServer.com/presentationDocuments/myDoc.doc where www.someContentServer.com is a domain name for a web server that maps to a network address such as an Internet Protocol address, for example, of a computer where a web server is located. A 'web server' is a server that supports data communications according the HyperText Transport Protocol ('HTTP'). The portion of the URI after the domain name, "presentationDocuments/myDoc.doc," is a pathname for a document on the computer on which the web server is located. In such an embodiment, retrieving (368) a presentation grammar includes retrieving the presentation document from the content server (106) in dependence upon the pathname and extracting the grammar from the presentation document. In an example where the presentation document is located according to a URI as described above and the content server is implemented with a web server, retrieving the presentation document from the content server may be carried out by parsing the URI into an HTTP GET message:

GET /presentationDocuments/myDoc.doc HTTP/1.1 and transmitting the GET message to the content server at www.ibmContentServer.com.

In this example, the content server returns the presentation document as URI encoded data in an HTTP RESPONSE message. In an example where the returned presentation document has this form:

```
<presentationDocument>
    <presentationGrammar>
        <grammarElement>
            <contentType id="WP">
            <keyPhrase>
                page down
            </keyPhrase>
            <presentationAction id="PgDn">
            <structuralElementIdentifier id="page">
        </grammarElement >
    </presentationGrammar>
    <structuredDocument>

<p id="1"> a paragraph </p>
            <p id="2"> another paragraph </p> some text 
    </structuredDocument>
</presentationDocument>,
``` extracting the grammar from the presentation document may be carried out by extracting the portion of the presentation document identified by the tags:

```
<presentationGrammar> </presentationGrammar>
```

In another exemplary embodiment of the method of FIG. 12, the presentation document (118) is implemented as an instance of an object oriented class on a content server (106). In this example, the presentation document has a presentation document name, and the presentation grammar comprises a member data element of the instance. In such an embodiment, storing (366) a location (364) of the presentation document (118) in the data structure (128) representing a presentation includes storing the presentation document name and a network location of the content server.

An example of storing a pathname and a network location is storing a URI for the document in a URI array such as that illustrated at reference (220) on FIG. 2. Such a URI may have the form:

http://www.ibmContentServer.com/servlets/
getPresentationGrammar?presDoc=myDoc.doc where www.someContentServer.com is a domain name for a web server. The portion of the URI after the domain name but before the question mark, "servlets/getPresentationGrammar," is a pathname for server-side functionality for retrieving a presentation document. The server-side functionality could be a CGI (Common Gateway Interface ('CGI') script or other server-side functionality as will occur to those of skill in the art, but in this example the server-side functionality is taken as a Java servlet identified by its name, "getPresentationGrammar." The remainder of the URI is query data encoded as a name-value pair identifying the name of a presentation document, "myDoc.doc," from which a presentation grammar is to be extracted by the servlet.

In such an exemplary embodiment, retrieving (368) a presentation grammar is carried out by requesting the presentation grammar (120) from the content server (106), including communicating the presentation document name as a request parameter; and receiving the presentation grammar (120) in response from the content server (106). In an example where the presentation document is located according to a URI as described above and the content server is implemented with a web server, requesting the presentation grammar (120) from the content server (106), including communicating the presentation document name as a request parameter, may be carried out by parsing the URI into an HTTP GET message:

GET /servlets/getPresentationGrammar?presDoc=myDoc.doc HTTP/1.1 and transmitting the GET message to the content server at www.ibmContentServer.com.

In another exemplary embodiment of the method of FIG. 12, the presentation document (118) includes a record in a table in a database on a content server (106). In this example, the presentation document has a presentation document identifier, and the presentation grammar comprises a field in the record. In such an embodiment, storing (366) a location (364) of the presentation document (118) in the data structure (128) representing a presentation includes storing the presentation document identifier and a network location of the content server. In a database table in which each record represents a presentation document, for example, the presentation document identifier may be implemented as a single field unique key such as a serial number for a record, as a presentation document name, or as any functional identifier as will occur to those of skill in the art. In the continuing discussion of this example, the presentation document identifier is taken as a presentation document name.

An example of storing a presentation document identifier and a network location is storing a URI for the document in a URI array such as that illustrated at reference (220) on FIG. 2. Such a URI may have the form:

http://www.ibmContentServer.com/cgi-bin/
getPresentationGrammar?presDoc=myDoc.doc where www.someContentServer.com is a domain name for a web server. The portion of the URI after the domain name but before the question mark, "/cgi-bin/getPresentationGrammar," is a pathname for server-side functionality for retrieving a presentation document. The server-side functionality could be a Java servlet or other server-side functionality as will occur to those of skill in the art, but in this example the server-side functionality is taken as a CGI script named "getPresentationGrammar." The remainder of the URI is query data encoded as a name-value pair identifying the name of a presentation document, "myDoc.doc," from which a presentation grammar is to be extracted by the CGI script.

In such an exemplary embodiment, retrieving (368) a presentation grammar is carried out by requesting the presentation grammar (120) from the content server (106), including communicating the presentation document name as a request parameter; and receiving the presentation grammar (120) in response from the content server (106). In an example where the presentation document is located according to a URI as described above and the content server is implemented with a web server, requesting the presentation grammar (120) from the content server (106), including communicating the presentation document name as a request parameter, may be carried out by parsing the URI into an HTTP GET message:
GET /cgi-bin/getPresentationGrammar?presDoc=myDoc.doc HTTP/1.1
and transmitting the GET message to the content server at www.ibmContentServer.com.

Creating a Voice Response Grammar from a User Grammar

Figure 13:
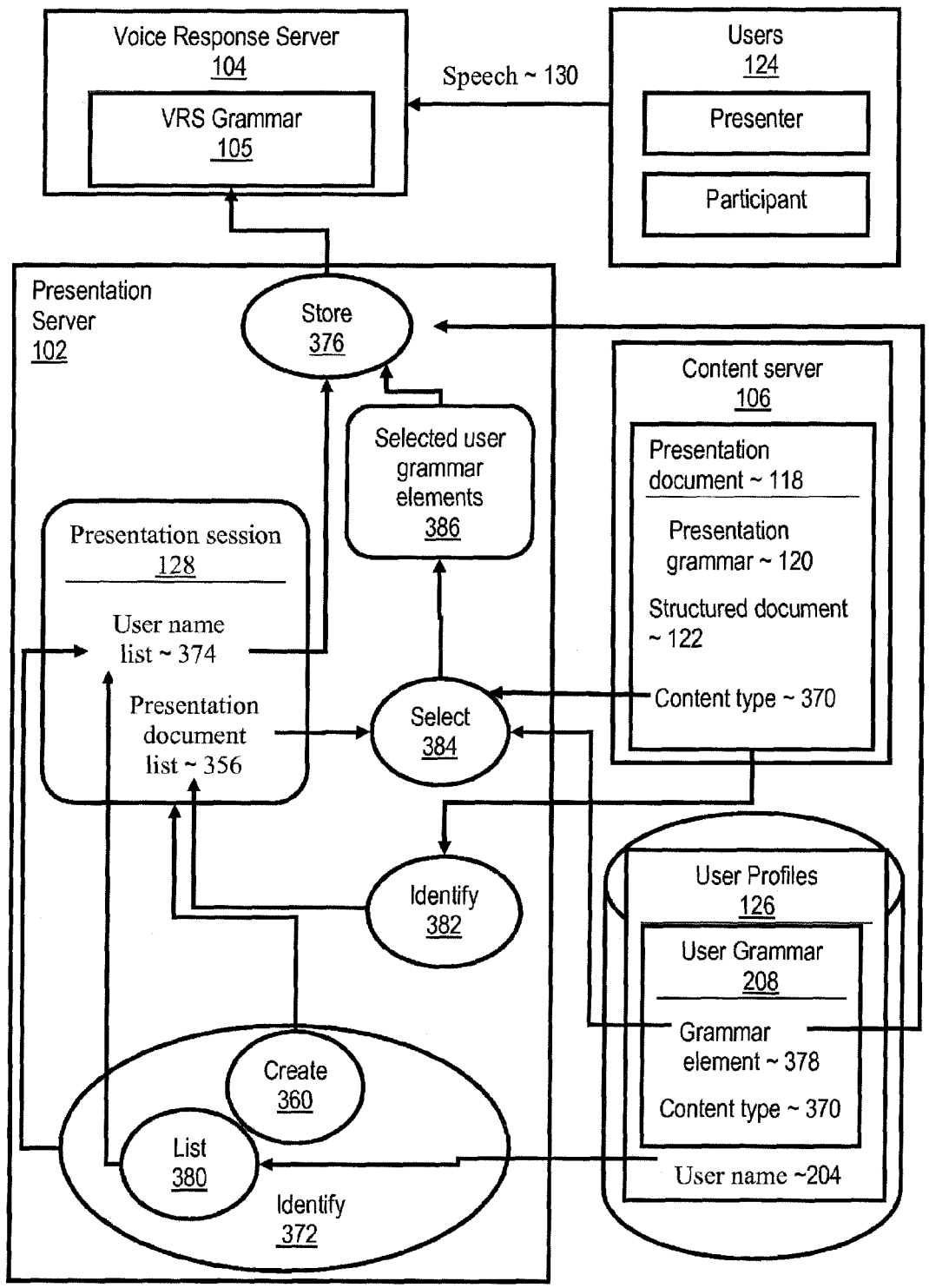
FIG. 13 sets forth a data flow diagram illustrating an exemplary method for creating a voice response grammar in a voice response server.

FIG. 13 sets forth a data flow diagram illustrating a method for creating a voice response grammar in a voice response server including identifying (372) a user (374) for a presentation where the user has a user grammar (208) and the user grammar includes one or more user grammar elements (378). The method of FIG. 13 also includes storing (376) a multiplicity of user grammar elements (378) for the user in a voice response grammar (105) on a voice response server (104). A user grammar is a data structure that includes a set of key phrases specific to a user that are used to formulate presentation control instructions for invoking presentation actions on presentation servers. For a presentation control instruction that invokes a presentation action instructing a presentation session to 'page down,' for example, an individual user may chose to associate with that presentation control instruction the key phrase "rock and roll" or "boogie on down" or any other key phrase favored by a user as will occur to those of skill in the art. Although these particular example are somewhat fanciful, in fact, user grammars serve a useful purpose by providing key phrases for presentation actions that distinguish normal speech. User grammars and voice response grammars may be structured like the full grammars illustrated in FIG. 5 with grammar elements (502-514) for a content type (410).

In the method of FIG. 13, identifying (372) a user for a presentation includes creating (360) a data structure (128) representing a presentation and listing (380) in the data structure (128, 374) at least one user identification (204). A data structure representing a presentation may be implemented as an instance of a presentation session class as shown at reference (128) on FIG. 2. In the method of FIG. 13, listing (380) in the data structure (128, 374) at least one user identification (204) includes creating a list of user names of the users that are registered with the presentation session. That is, a list of users currently participating in the presentation.

In the example of FIG. 13, the user grammar (208) includes a multiplicity of user grammar elements (378) for a content type (370). In this example, each grammar element includes an identifier of a structural element, a key phrase for invoking a presentation action, and an action identifier representing the presentation action, as shown for example in the depiction of an exemplary full grammar at references (318), (518), and (516) on FIG. 5.

The method of FIG. 13 includes identifying (382) presentation documents (118) for the presentation. In this example, each presentation document (118) having a content type (370), and selecting (384) user grammar elements (386) according to the content type (370) of the identified presentation documents (356). In the example of FIG. 13, selecting (384) user grammar elements (386) according to the content type (370) of the identified presentation documents (356) includes comparing the elements of the user grammar with each presentation document in the presentation session and extracting each element of the grammar having the same content type as a presentation document in the presentation session. In the method of FIG. 13, storing (376) a multiplicity of user grammar elements for the user in a voice response grammar on a voice response server is carried out by storing the selected user grammar elements (386) in the voice response grammar (105).

Figure 14:
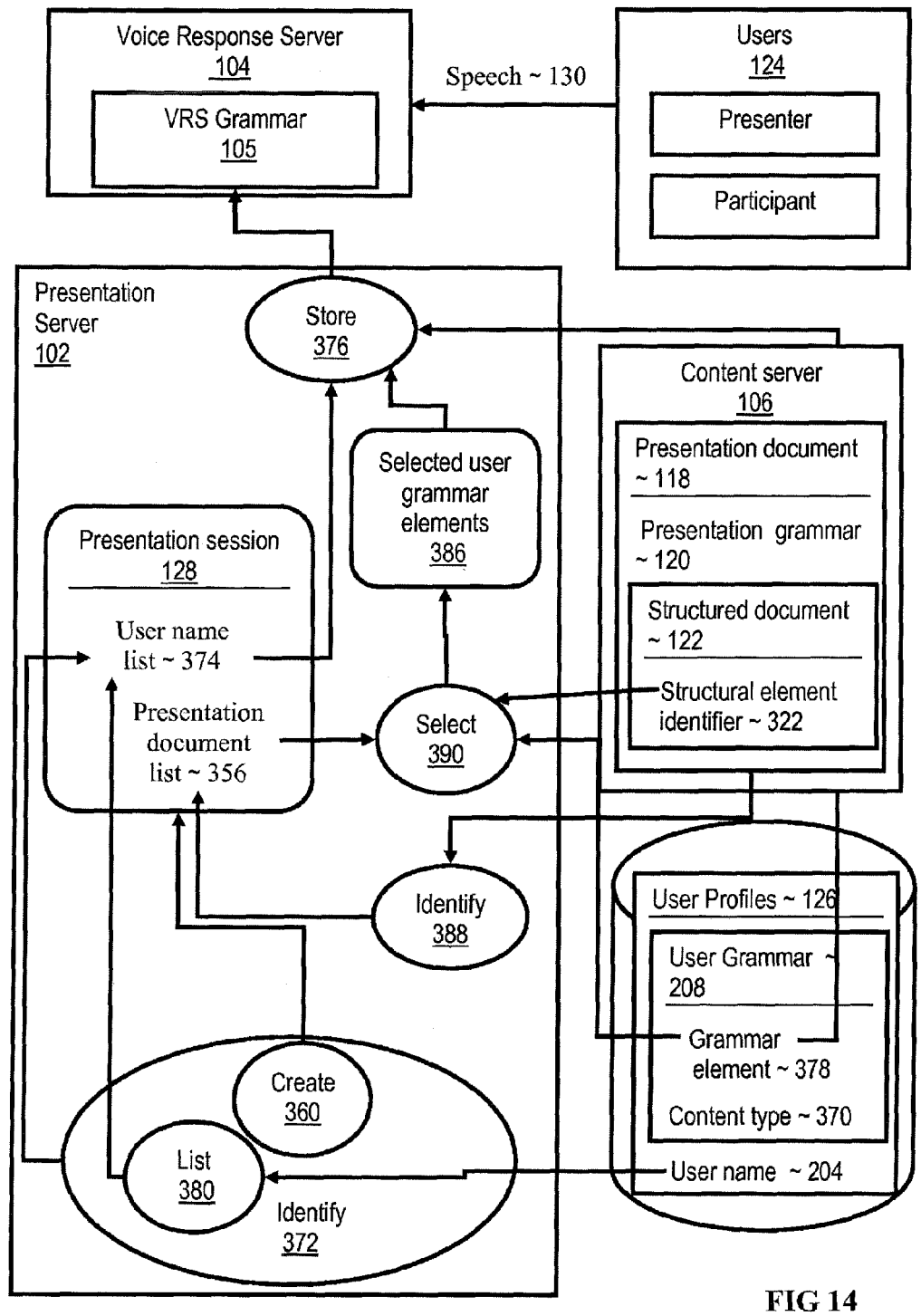
FIG. 14 is a data flow diagram illustrating an alternative exemplary method for creating a voice response grammar in a voice response server.

FIG. 14 is a data flow diagram illustrating an alternative exemplary method for creating a voice response grammar in a voice response server. The method of FIG. 14 includes identifying (388) presentation documents (118) for the presentation. The presentation documents (118) in this example include structured documents (122) having structural element identifiers (322). In the example of FIG. 14, the identified presentation documents are included in a presentation document list (356) in the presentation session.

The user grammar (208) in this example includes a multiplicity of user grammar elements (378), and the method includes selecting (390) user grammar elements (378) in dependence upon the structural element identifiers (322). In this example, selecting (390) user grammar elements (378) in dependence upon the structural element identifiers (322) is carried out by comparing the elements of the user grammar with each structured document of each presentation document in the presentation session and extracting each user grammar element having a structural element identifier for a structural element that occurs in a structured document of a presentation document in the presentation session. In the method of FIG. 14, storing (376) a multiplicity of user grammar elements for the user in a voice response grammar on a voice response server includes storing the selected user grammar elements (386) in the voice response grammar (105).

Figure 15:
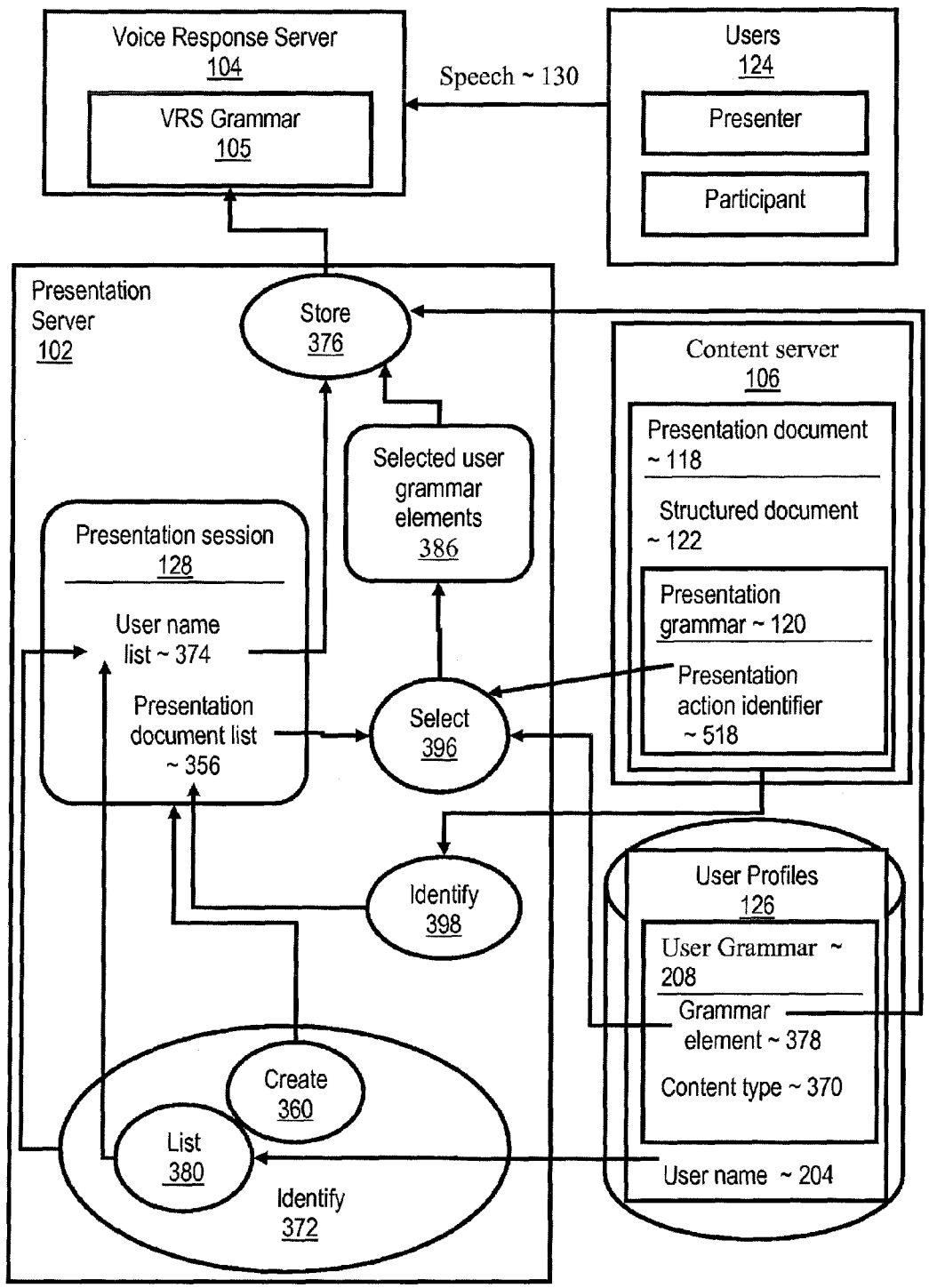
FIG. 15 is a data flow diagram illustrating another alternative exemplary method for creating a voice response grammar in a voice response server.

FIG. 15 is a data flow diagram illustrating another alternative exemplary method for creating a voice response grammar in a voice response server. The method of FIG. 15 includes identifying (394) presentation documents (118) for the presentation. Each presentation document (118) has a presentation grammar (120) including presentation action identifiers (518).

In the example of FIG. 15, the user grammar (208) includes a multiplicity of user grammar elements (378), and the method includes selecting (396) user grammar elements (378) in dependence upon the presentation action identifiers (518). In this example, selecting (396) user grammar elements (378) in dependence upon the presentation action identifiers (518) is carried out by comparing the elements of the user grammar with each presentation grammar of each presentation document of the presentation session and extracting from the user grammar each element having a presentation action identifier that occurs in a presentation grammar of the presentation document. In the method of FIG. 15, storing (376) a multiplicity of user grammar elements for the user in a voice response grammar on a voice response server includes storing the selected user grammar elements (386) in the voice response grammar (105).

Creating a Session Document from a Presentation Document

Figure 16:
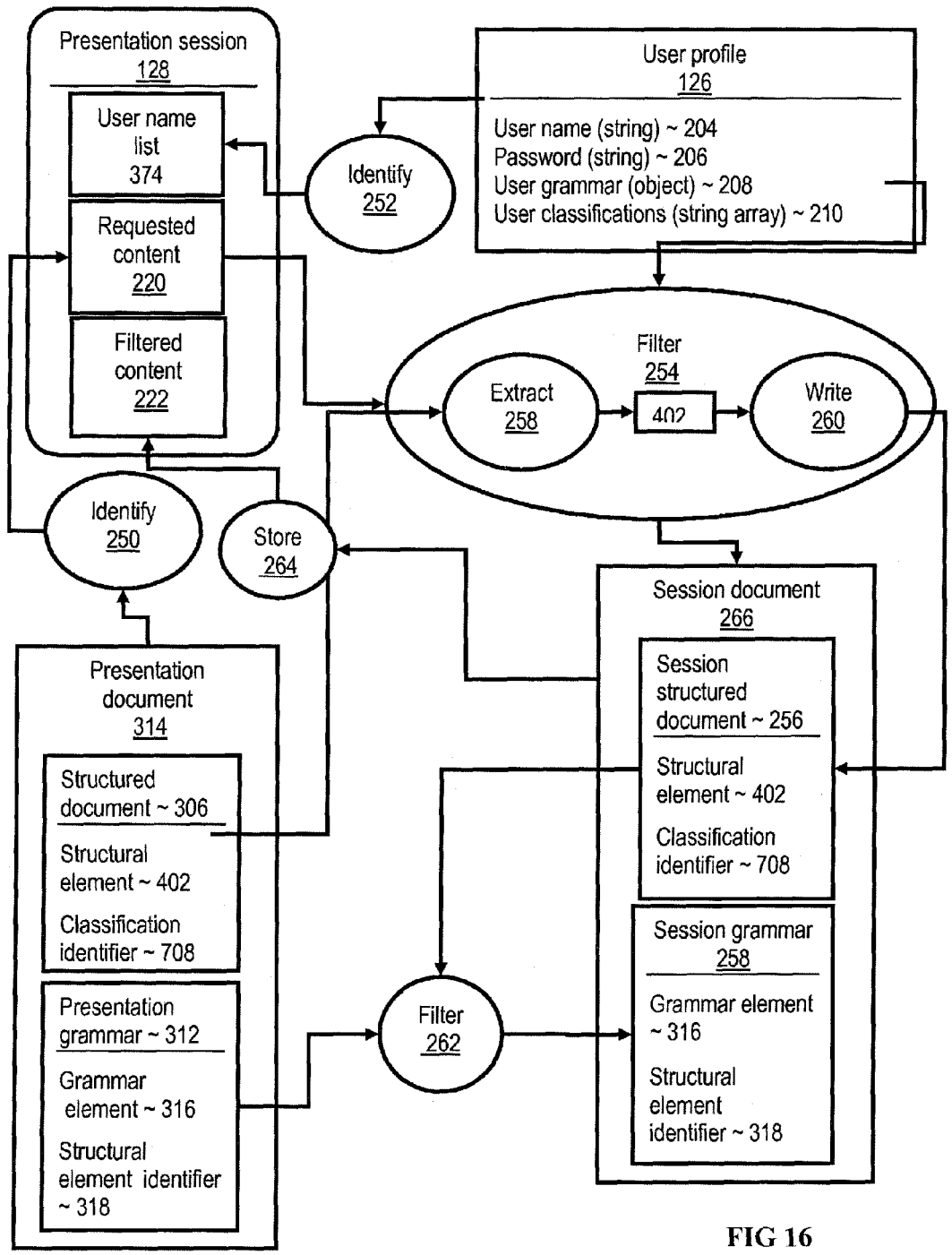
FIG. 16 sets forth a data flow diagram illustrating an exemplary method for creating a session document from a presentation document.

FIG. 16 sets forth a data flow diagram illustrating an exemplary method for creating a session document (266) from a presentation document (314). A session document is a repository for filtered content, presentation content that is filtered according to attributes of an audience for a presentation, an audience that presents a range of affiliations, technical abilities, security authorizations, and other attributes as will occur to those of skill in the art. The purpose of a session document is to provide a repository for reducing the volume of data for a presentation with respect to unfiltered presentation documents. A session document is a document derived from a presentation document targeted for the participants of a presentation. More particularly, a session document is a data structure that includes a session grammar derived from a presentation grammar in a presentation document and a session structured document derived from a structured document in a presentation document.

The method of FIG. 16 includes identifying (250) a presentation document (314) for a presentation. The presentation document (314) includes a presentation grammar (312) and a structured document (306) having structural elements (402) classified with classification identifiers (708). Identifying (250) a presentation document (314) typically includes inserting in a list (220) a location for the presentation document (314). The location of a presentation document may be represented by a URI, and a list of locations identifying presentation documents may be implemented as an array of URIs as exemplified by the requested content list (220) in the exemplary presentation session class (128) on FIG. 2.

The method of FIG. 16 includes identifying (252) a user participant (204) for the presentation. In the method of FIG. 16, the user has a user profile (126) that includes user classifications (210) each of which describes some attribute of a user, such as, for example, company affiliation, department membership, technical ability, security authorization level, and so on, for any attribute of a user as may occur to those of skill in the art. Identifying (252) a user (204) typically includes inserting in a list (374) a user identification (204) identifying a user in a presentation participant list (374). In the example of FIG. 16, a user identification is implemented as a user name (204) in a user profile (126).

The method of FIG. 16 includes filtering (254) the structured document (306) in dependence upon the user classifications (210) and the classification identifiers (708). In the method of FIG. 16, filtering (254) the structured document (306) is carried out by extracting (259), from the structured document (306), structural elements (402) having classification identifiers (708) corresponding to the user classifications (210), and writing (260) the extracted structural elements (402) into a session structured document (256) in the session document (266). The method of FIG. 16 also includes filtering (262) the presentation grammar (312), in dependence upon the extracted structural elements (402), into a session grammar (258) in the session document (266). The method of FIG. 16 includes storing (264) the location of the session document (266) in a session document list (222).

For further explanation, consider an example of creating a session document that begins with a presentation document having the following contents:

```
<presentationDocument>
    <presentationGrammar>
        <grammarElement>
            <contentType id="WP">
            <keyPhrase>page down</keyPhrase>
            <presentationAction id="PgDn">
            <structuralElementIdentifier id="page">
        </grammarElement >
        <grammarElement>
            <contentType id="WP">
            <keyPhrase>next bullet</keyPhrase>
            <presentationAction id="NextBullet">
            <structuralElementIdentifier id="bullet">
        </grammarElement >
    </presentationGrammar>
    <structuredDocument>

<p id="1">a paragraph on some subject</p>

```

-continued

```
            <p id="2">a paragraph on a particular subject</p>
            <tech level="2">
                <p id="2">a more technical paragraph, same
                    subject</p>
            </tech>
            <security level="2">
                <p id="2">a more secret paragraph, same subject</p>
            </security>
            <dept id="marketing">
                <p id="2">a paragraph, same subject, with added
                    detail regarding marketing
                    <bullet id ="1">some bullet text</bullet>
                    <bullet id ="1">some other bullet text</bullet>
                    <bullet id ="1">still more bullet text</bullet>
                </p>
            </dept>
            <company id="IBM">
                <p id="2">a paragraph, same subject with added detail
                    pertinent to a user's company</p>
            </company>
            <p id="3">a paragraph on some other subject</p>
            ... ... ...

</structuredDocument>
</presentationDocument>
```

In this example, an audience of users identified for a presentation include users having in their user profiles user classifications indicating technical level '2' and membership in IBM. None of the registered users have security authorizations and none of them are from the marketing department. Filtering this exemplary presentation document, extracting structural elements with classification identifiers corresponding to the user classifications, writing those structural elements to a session document, and filtering the presentation grammar in dependence upon the extracted structural elements, results in the following exemplary session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
                <p id="2">a more technical paragraph, same subject</p>
            </tech>
            <company id="IBM">
                <p id="2">a paragraph, same subject with added detail
                    pertinent to a user's company</p>
            </company>
            <p id="3">a paragraph on some other subject</p>
            ... ... ...

</sessionStructuredDocument>
</sessionDocument>
```

In the resulting session document, the structural element identified as page 2 now excludes versions for security level 2 and for marketing, because none of the users listed for the presentation are in the marketing department or have security authorizations of level 2. In addition, the session grammar excludes a grammar element for bullets because, in the session document above, the only structural element having bullets was the version of paragraph 2 for the marketing department. Excluding the bullets as structural elements in the session structured document means that there is no need to have grammar elements for them in the session grammar. Reducing the number of grammar elements in the session grammar reduces the number of grammar elements in the voice response grammar, thereby increasing the efficiency and accuracy of the voice response server and the overall presentation system.

Amending a Session Document During a Presentation

Figure 17:
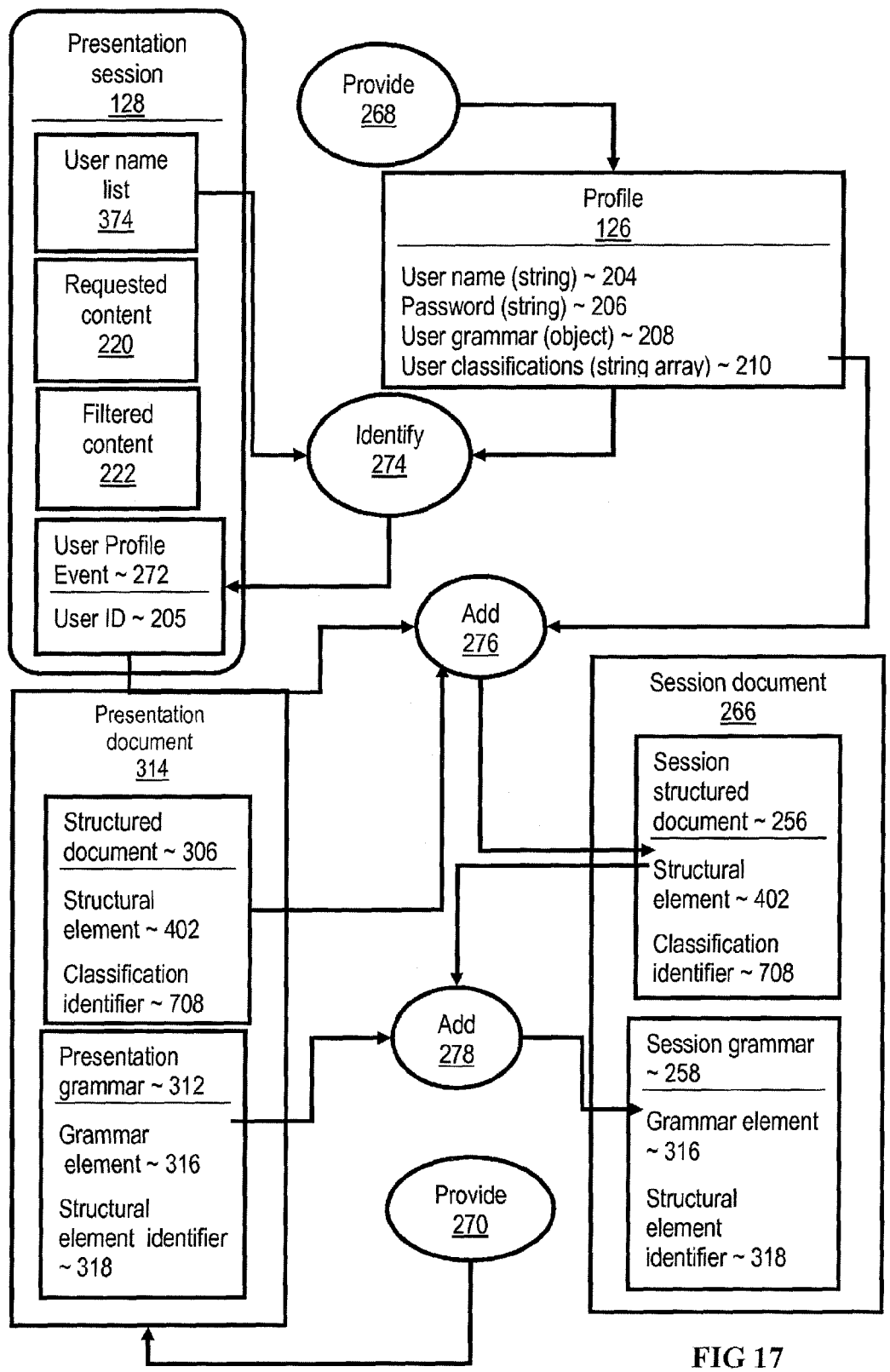
FIG. 17 sets forth a data flow diagram illustrating an exemplary method for amending a session document during a presentation.

FIG. 17 sets forth a data flow diagram illustrating an exemplary method for amending a session document (266) during a presentation. The session document (266) includes a session structured document (256), and the method of FIG. 17 includes providing (268) user profiles (126) representing users capable of participating in presentations. In typical embodiments, user profiles for all the users capable of participating in presentations are stored in a database accessible to the presentation session. In the example of FIG. 17, each user profile (126) includes user classifications (210) for a user.

The method of FIG. 17 also includes providing (270) a presentation document (314) that includes a structured document (306) having structural elements (402) classified with classification identifiers (708). In the example of FIG. 17, the locations of the presentation documents from which the session documents for a particular presentation were created are stored in a list such as the requested content list (220) of FIG. 17.

The method of FIG. 17 includes identifying (274) a user profile event (272) for a user during the presentation. A user profile event is an event that results in adding a user classification to the set of user classifications for a presentation. The set of user classifications for a presentation is the set of all user classifications for all users that have been identified as users for a presentation. A user profile event may be represented as a data structure (272) that includes a user identification (205) for a particular user.

A user profile event (272) may be generated by adding a user to the presentation, where the added user has a new user classification for the presentation. That is, one example of a user profile event (272) is adding to a presentation a user whose user classifications include at least one user classification having no corresponding classification identifier in any structural element in the session structured document. In such an example, at least one of the added user's user classifications is currently not part of any user profile of any of the other users identified for the presentation.

A user profile event (272) also may be generated, for a further example, by changing a user classification (210) in a user profile (126) of a user who is participating in the presentation, where the changed user classification includes a new user classification for the presentation. That is, one example of a user profile event (272) is editing a user's profile during a presentation so that the user's user profile now includes a user classification having no corresponding classification identifier in any structural element in the session structured document. In such an example, the new user classification is currently not part of any user profile of any of the other users identified for the presentation.

The method of FIG. 17 includes adding (276) to the session structured document (256) at least one structural element (402) from the presentation document (314), the added structural element (402) having a classification identifier (708) that corresponds to a user classification (210) of the user. In the examples just mentioned, regarding adding a new user to a presentation or a new user classification to a profile, adding (276) to the session structured document (256) a structural element (402) from the presentation document (314), the added structural element (402) having a classification identifier (708) that corresponds to a user classification (210) of the user, means that the new structural element is one that no other user identified for the presentation was entitled to view. Because adding a structural element may mean adding a structural element of a kind not otherwise represented in the session structured document, the method of FIG. 17 advantageously also includes adding (278) a grammar element (316) to the session grammar (258) in dependence upon the added structural element (402).

For further explanation, consider the following example of amending a session document (266) during a presentation. In this example, a session document is used for a presentation having users whose user profiles include user classifications of technical level '2' and membership in IBM:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same subject</p>
            </tech>
            <company id="IBM">
            <p id="2">a paragraph, same subject with added detail
                pertinent to a user's company</p>
            </company>
            <p id="3">a paragraph on some other subject</p>
            ... ... ...

</sessionStructuredDocument>
</sessionDocument>
```

This session document in this example was created from the following presentation document:

```
<presentationDocument>
    <presentationGrammar>
        <grammarElement>
            <contentType id="WP">
            <keyPhrase>page down</keyPhrase>
            <presentationAction id="PgDn">
            <structuralElementIdentifier id="page">
        </grammarElement >
        <grammarElement>
            <contentType id="WP">
            <keyPhrase>next bullet</keyPhrase>
            <presentationAction id="NextBullet">
            <structuralElementIdentifier id="bullet">
        </grammarElement >
    </presentationGrammar>
    <structuredDocument>

<p id="1">a paragraph on some subject</p>

```

```

<p id="2">a paragraph on a particular subject</p>
                <tech level="2">
                <p id="2">a more technical paragraph, same
                    subject</p>
                </tech>
                <security level="2">
                <p id="2">a more secret paragraph, same subject</p>
                </security>
                <dept id="marketing">
                <p id="2">a paragraph, same subject, with added
                    detail regarding marketing
                    <bullet id ="1">some bullet text</bullet>
                    <bullet id ="1">some other bullet text</bullet>
                    <bullet id ="1">still more bullet text</bullet>
                </p>
                </dept>
                <company id="IBM">
                <p id="2">a paragraph, same subject with added detail
                    pertinent to a user's company</p>
                </company>
                <p id="3">a paragraph on some other subject</p>
                ... ... ...

</structuredDocument>
</presentationDocument>
```

The session document in this example contains no structural elements classified for users from the marketing department. After beginning the presentation a user from the marketing department joins the presentation. The user's joining the presentation is represented by adding the user's user identification to a list of users identified for the presentation. Adding the user ID to the list identifies (274) a user profile event (272) which is represented by a data structure that includes the user's user identification (205). Amending the session document proceeds by adding (276) to a session structured document (256) one or more structural elements (402) from a structured document in the presentation document from which the session structured document was created. Adding (276) to the session structured document (256) at least one structural element (402) from the presentation document (314) is carried out by adding a structural element (402) having a classification identifier (708) that corresponds to a user classification (210) of the user. User classifications of the user are read from the user profiles (126) using the user identification (205) provided to the adding process (276) by the user profile event (272). In this example, adding a structural element to the session structured documents is carried out by adding the following paragraph from the structured document of the presentation document set forth above:

```
<dept id="marketing">
<p id="2">a paragraph, same subject, with added detail regarding
    marketing
    <bullet id ="1">some bullet text</bullet>
    <bullet id ="1">some other bullet text</bullet>
    <bullet id ="1">still more bullet text</bullet>
</p>
</dept>,
``` thereby creating the following amended session document:

```
<sessionDocument>
    <sessionGrammar>
        <grammarElement>
            <contentType id="WP">
            <keyPhrase>page down</keyPhrase>
            <presentationAction id="PgDn">
                <structuralElementIdentifier id="page">
            </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same subject</p>
            </tech>
            <company id="IBM">
            <p id="2">a paragraph, same subject with added detail
                pertinent to a user's company</p>
            </company>
            <dept id="marketing">
            <p id="2">a paragraph, same subject, with added detail
                regarding marketing
                <bullet id ="1">some bullet text</bullet>
                <bullet id ="1">some other bullet text</bullet>
                <bullet id ="1">still more bullet text</bullet>
            </p>
            </dept>
            <p id="3">a paragraph on some other subject</p>
            ... ... ...

</sessionStructuredDocument>
</sessionDocument>
```

Amending the session document also includes adding to the session grammar of the session document a new grammar element from the presentation grammar. There were no bullets in the session structured document before the exemplary user profile event and therefore no grammar elements supporting presentation control instructions for bullets. Adding the marketing paragraph also added bullets, so the method advantageously includes adding grammar elements supporting presentation control instructions for bullets:

```
<grammarElement>
    <contentType id="WP">
    <keyPhrase>next bullet</keyPhrase>
    <presentationAction id="NextBullet">
        <structuralElementIdentifier id="bullet">
</grammarElement >,
``` thereby creating the following amended session document:

```
<sessionDocument>
    <sessionGrammar>
        <grammarElement>
            <contentType id="WP">
            <keyPhrase>page down</keyPhrase>
            <presentationAction id="PgDn">
                <structuralElementIdentifier id="page">
        </grammarElement >
        <grammarElement>
            <contentType id="WP">
            <keyPhrase>next bullet</keyPhrase>
            <presentationAction id="NextBullet">
                <structuralElementIdentifier id="bullet">
        </grammarElement >
    </sessionGrammar>
    <sessionStructuredDocument>

<p id="1"> a paragraph </p>
            <p id="2"> another paragraph </p>

```

-continued

```

<p id="2">a paragraph on a particular subject</p>
        <tech level="2">
            <p id="2">a more technical paragraph, same subject</p>
        </tech>
        <company id="IBM">
            <p id="2">a paragraph, same subject with added detail
                pertinent to a user's company</p>
        </company>
        <dept id="marketing">
            <p id="2">a paragraph, same subject, with added detail
                regarding marketing
                <bullet id ="1">some bullet text</bullet>
                <bullet id ="1">some other bullet text</bullet>
                <bullet id ="1">still more bullet text</bullet>
            </p>
        </dept>
        <p id="3">a paragraph on some other subject</p>
        ... ... ...

</sessionStructuredDocument>
</sessionDocument>
```

Differential Dynamic Content Delivery

Figure 18:
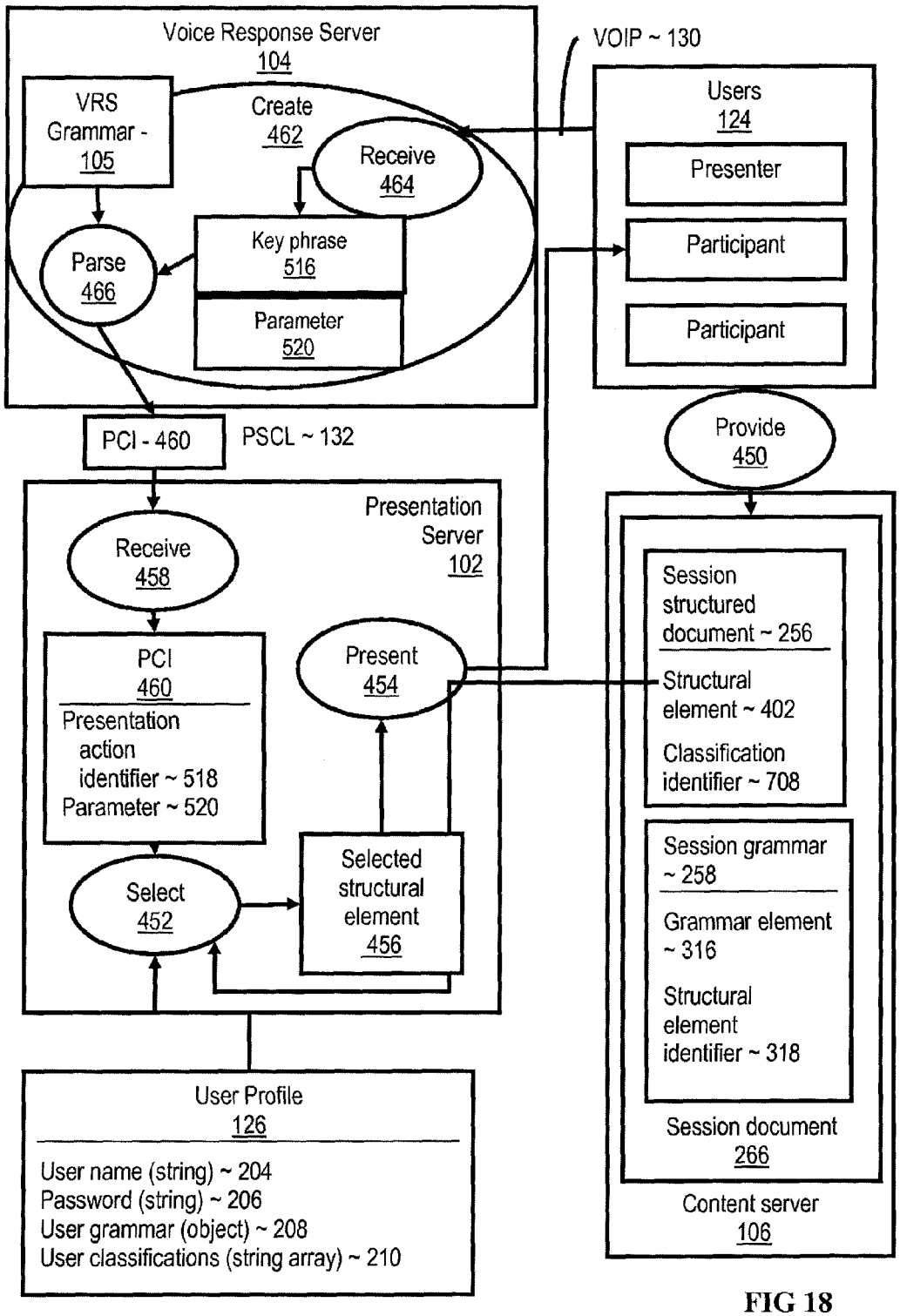
FIG. 18 sets forth a data flow diagram illustrating an exemplary method for differential dynamic content delivery.

FIG. 18 sets forth a data flow diagram illustrating an exemplary method for differential dynamic content delivery. Differential dynamic content delivery is delivery of the content of a presentation to user participants according to a wide variety of participant interest, company, group, or department membership, technical knowledge, security authorization, and so on, across almost any dimension in which participants may vary. Differential dynamic content delivery is accomplished generally in methods and systems according to embodiments of the present invention by use of structured, classified documents, presentation documents and session documents, each of which includes a grammar and a structured document as described below. Using such documents as a source of presentation content, differential dynamic content delivery is accomplished then by selecting from a structured document classified structural elements for delivery to particular user participants according to the classification identifiers in the document and user classifications from user profiles.

FIG. 18 sets forth a data flow diagram illustrating an exemplary method for differential dynamic content delivery that includes providing (450) a session document (266) for a presentation. In the method of FIG. 18, the session document (266) includes a session grammar (258) and a session structured document (256), and providing (450) a session document (266) for a presentation is carried out by creating a session document from a presentation document as described in detail above in the discussion regarding FIG. 16.

The method of FIG. 18 also includes creating (462) a presentation control instruction (460). A presentation control instruction is an instruction to a presentation server (102) to carry out a particular presentation action such as, for example, 'display next page,' 'display next slide,' 'display paragraph 5,' and so on. More particularly, in differential dynamic content delivery, presentation actions are carried out by presenting to a particular user a version of a particular structural element, such as a paragraph or a slide, according to user classifications such as company name, department name, security authorization, and so on. In the method of FIG. 18, an exemplary presentation control instruction (460) includes a presentation action identifier (518) and one or more optional parameters (520).

In the method of FIG. 18, creating the presentation control instruction is carried out by receiving (464) from a user (124) participating in the presentation a key phrase (516) and optional parameters (520) for invoking a presentation action and parsing (466) the key phrase (516) and parameters (520) against a voice response grammar (105) into a presentation control instruction (460). In this example, receiving (464) a key phrase (516) is carried out by use of a Voice Over Internet Protocol ("VOIP") link (130) that carries the speech of at least one user (124) from the user's client device to a voice response server (104). A VOIP link is a kind of computer hardware and software that uses an internet protocol network instead of a traditional telephone network as the transmission medium for speech. VOIP is sometimes referred to as 'IP telephony' or 'Voice Over the Internet' ("VOI"). Examples of user client devices include any computer equipment capable of converting input speech to digital data and transmitting it over the internet protocol to a voice response server, including handheld wireless devices, personal digital assistants, personal computers, laptop computers, and the like.

The method of FIG. 18 also includes receiving (458) a presentation control instruction (460) in a presentation server and selecting (452) from a session structured document (256) a classified structural element (402) in dependence upon user classifications (210) of a user participant (124) in the presentation. In the method of FIG. 18, selecting (452) a classified structural element (402) is carried out by selecting a classified structural element (402) in dependence upon the presentation action identifier (518) and the parameters (520) from the presentation control instruction (460). In the method of FIG. 18, selecting (452) a classified structural element (402) also includes selecting a classified structural element having an associated classification identifier (708) that corresponds to the user classification (210).

For further explanation, consider an example using the following exemplary session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same
                subject</p>
            </tech>
            <company id="IBM">
            <p id="2">a paragraph, same subject with added detail
                pertinent to a user's company</p>
            </company>
            <p id="3">a paragraph on some other subject</p>
            ... ... ...

</sessionStructuredDocument>
</sessionDocument>
```

In this example, assume that a first user participant has in a user profile user classifications indicating that the user is an IBM employee and a second user has user classifications indicating that the user has technical ability level '2'. In this example, a presentation server having the above session document installed upon it receives (458) a presentation control instruction (460) to move to the display to the second page of the session structured document. The presentation server then selects (452) from the session structured document (256) for the first user the structural element identified as a version of page two and classified as:

```
<company id="IBM">
  <p id="2">a paragraph, same subject with added detail
    pertinent to a user's company</p>
</company>
``` and for the second user the structural element identified as a version of page two and classified as:

```
<tech level="2">
  <p id="2">a more technical paragraph, same subject</p>
</tech>
```

The method of FIG. 18 also includes presenting (454) the selected structural element (456) to the user (124). In the method of FIG. 18, presenting (454) the selected structural element (456) to the user may be carried out, for example, by selecting a data communications protocol for the presentation, inserting the selected structural element (without its classification identifiers) in a data structure appropriate to the data communications protocol, and transmitting the data structure to the user according to the data communications protocol. If, for example, the data communications protocol is selected as HTTP, a data structure appropriate to the data communications protocol is an HTML document in an HTTP RESPONSE message. In such an example, presenting (454) the selected structural element (456) to the user may be carried out, for the two exemplary versions of page two selected above, by the following HTTP RESPONSE messages:

```
HTTP/1.1 200 OK
Date: _____
Content-Type: text/xml
Content-Length: 128
<html><body><p id="2">a paragraph, same subject with added detail
pertinent to a user's company</p> </body></html>
``` and for the second user the structural element identified as a version of page two and classified as:

```
HTTP/1.1 200 OK
Date: _____
Content-Type: text/xml
Content-Length: 103
<html><body><p id="2">a more technical paragraph, same
subject</p></body></html>
``` respectively, the first sent to the client device of the first user and the second sent to the client device of the second user. Note that in both transmission, the classification identifiers are omitted, <company id="IBM"> and <tech level="2"> respectively.

This example of presenting (454) a selected structural element (456) to a user (124) is expressed in terms of HTML and HTTP, a stateless, asynchronous protocol. Many embodiments will statefully hold open a data communications connection, such as a TCP/IP connection, between a presentation server and a user client device. A Stateful Java Enterprise Session Bean may be used, for example, to hold open a TCP/IP connection implemented with a Java socket object. Readers of skill in the art will recognize therefore that HTML and HTTP are used for explanation, not for limitation. In fact, any presentation application using any appropriate data communications protocol useful for multi-media presentations may be used to present structural elements to users according to embodiments of the present invention. Such application may be obtained off-the-shelf commercially or they may be specially developed for particular presentations or kinds of presentation. An example of such an application available commercially is Microsoft NetMeeting™. Examples of other data communications protocols useful with various embodiments of the present invention include the Session Initiation Protocol ("SIP") specified in the IETF's RFC 2543, the Real Time Streaming Protocol ("RTSP") as specified in the IETF's RFC 2326, the Real Time Transport Protocol ("RTP") of RFC 1889, and the World Wide Web Consortium's VoiceXML protocol specified in the 2003 document entitled "Voice Extensible Markup Language (VoiceXML) Version 2.0".

Displaying Text in Dependence Upon Sound Level

Figure 19:
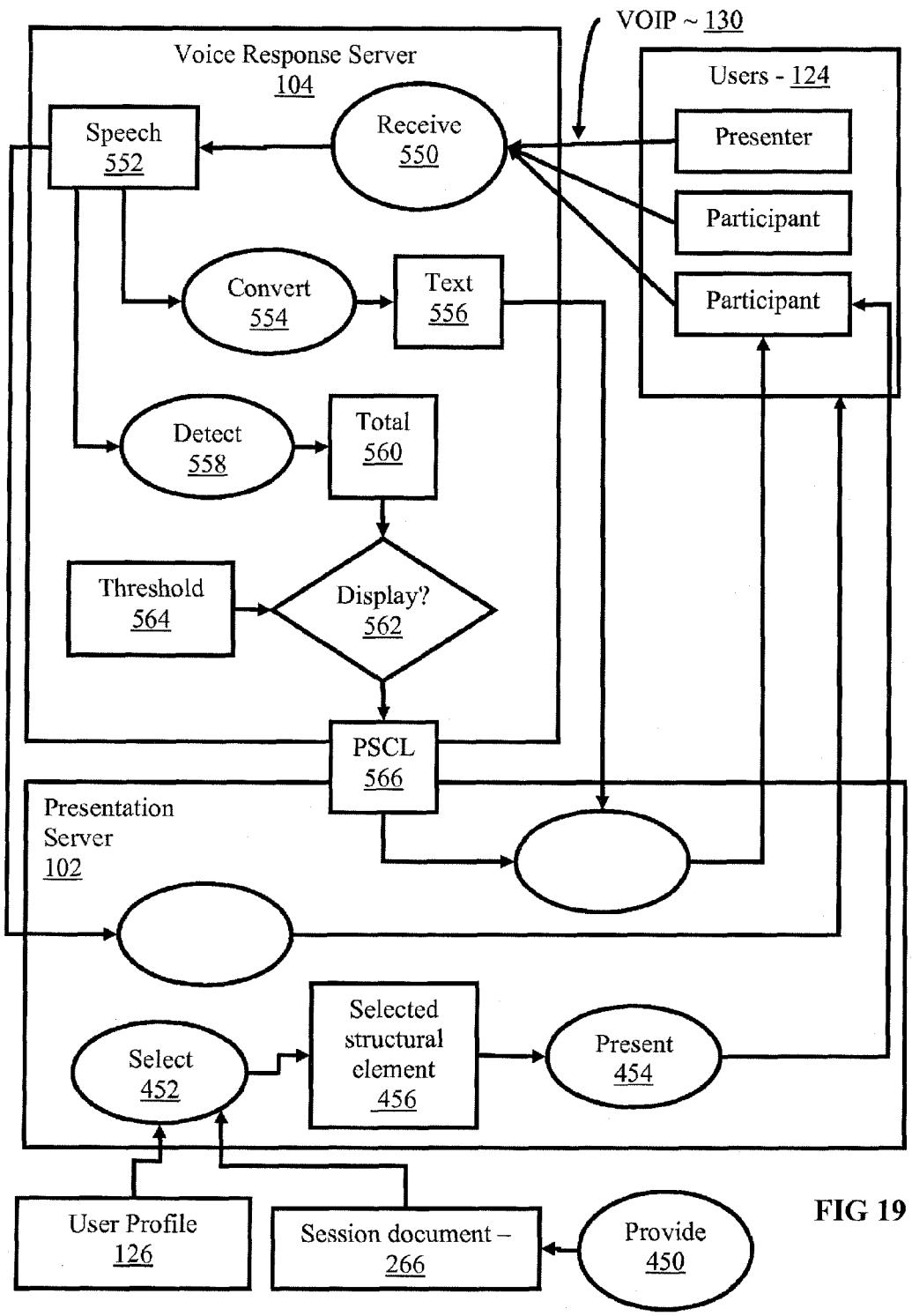
FIG. 19 sets forth a data flow diagram illustrating a further exemplary method for differential dynamic content delivery.

FIG. 19 sets forth a data flow diagram illustrating an exemplary method for differential dynamic content delivery that includes providing (450) a session document (266) for a presentation. In the method of FIG. 19, the session document (266) includes a session grammar and a session structured document as shown at references (256) and (258) on FIG. 18, and providing (450) a session document (266) for a presentation is typically carried out by creating a session document from a presentation document as described in detail above in the discussion regarding FIG. 16.

The method of FIG. 19 also includes selecting (452) from the session structured document a classified structural element (456) in dependence upon user classifications of a user participant in the presentation. In the method of FIG. 19, selecting (452) a classified structural element (456) is carried out, as described above in the discussion of FIG. 18, by selecting a classified structural element (402 on FIG. 18) in dependence upon a presentation action identifier (518 on FIG. 18) and parameters (520 on FIG. 18) from a presentation control instruction (460 on FIG. 18).

The method of FIG. 19 also includes presenting (454) the selected structural element (456) to the user. As disclosed above in the discussion of the method of FIG. 18, presenting (454) a selected structural element (456) to a user may be carried out, for example, by selecting a data communications protocol for the presentation, inserting the selected structural element (without its classification identifiers) in a data structure appropriate to the data communications protocol, and transmitting the data structure to the user according to the data communications protocol. Examples of data communications protocols useful with various embodiments of the present invention include HTTP, SIP, RTSP, and RTP.

The method of FIG. 19 also includes streaming (568) speech to the user from one or more users (124) participating in the presentation. Speech may be streamed to a user over TCP/IP, through RTSP, or otherwise as will occur to those of skill in the art. The method of FIG. 19 includes converting (554) the speech (552) to text (556). Converting speech to text may be carried out by use of an off-the-shelf speech to text converter such as the ViaVoice™ products from IBM, the Dragon NaturallySpeaking products available from Scansoft, Inc., of Peabody, Mass., and others as will occur to those of skill in the art.

The method of FIG. 19 also includes detecting (558) a total sound level (560) for the user and determining (562) whether to display the text in dependence upon the total sound level (560) for the user. A workstation from which users participate in a presentation is typically equipped with a microphone, a speaker, and optionally other communications devices enabling the user to participate orally and audibly in the presentation. In the example of FIG. 19, users (124) are connected for data communications on VOIP channels (130) through a voice response server (104) to a presentation server (102). The total sound level for a user is represented by a signal level on the user's VOIP channel. Each VOIP channel takes as its input a signal gathered from a microphone in a user's workstation environment. In the example of FIG. 19, when the total sound level on a user's data communications channel is greater than a predetermined threshold (564), a presentation control instruction is sent to the presentation server (102) instructing the presentation server to display the text (556). That is, in some cases, a total sound level on a user's data communications channel is greater than a predetermined threshold indicating that the user may not be able to adequately hear the streaming speech of the presentation. Displaying the text converted from speech advantageously enables a user participant to follow the presentation even if the user cannot actually hear the speech.

Figure 20:
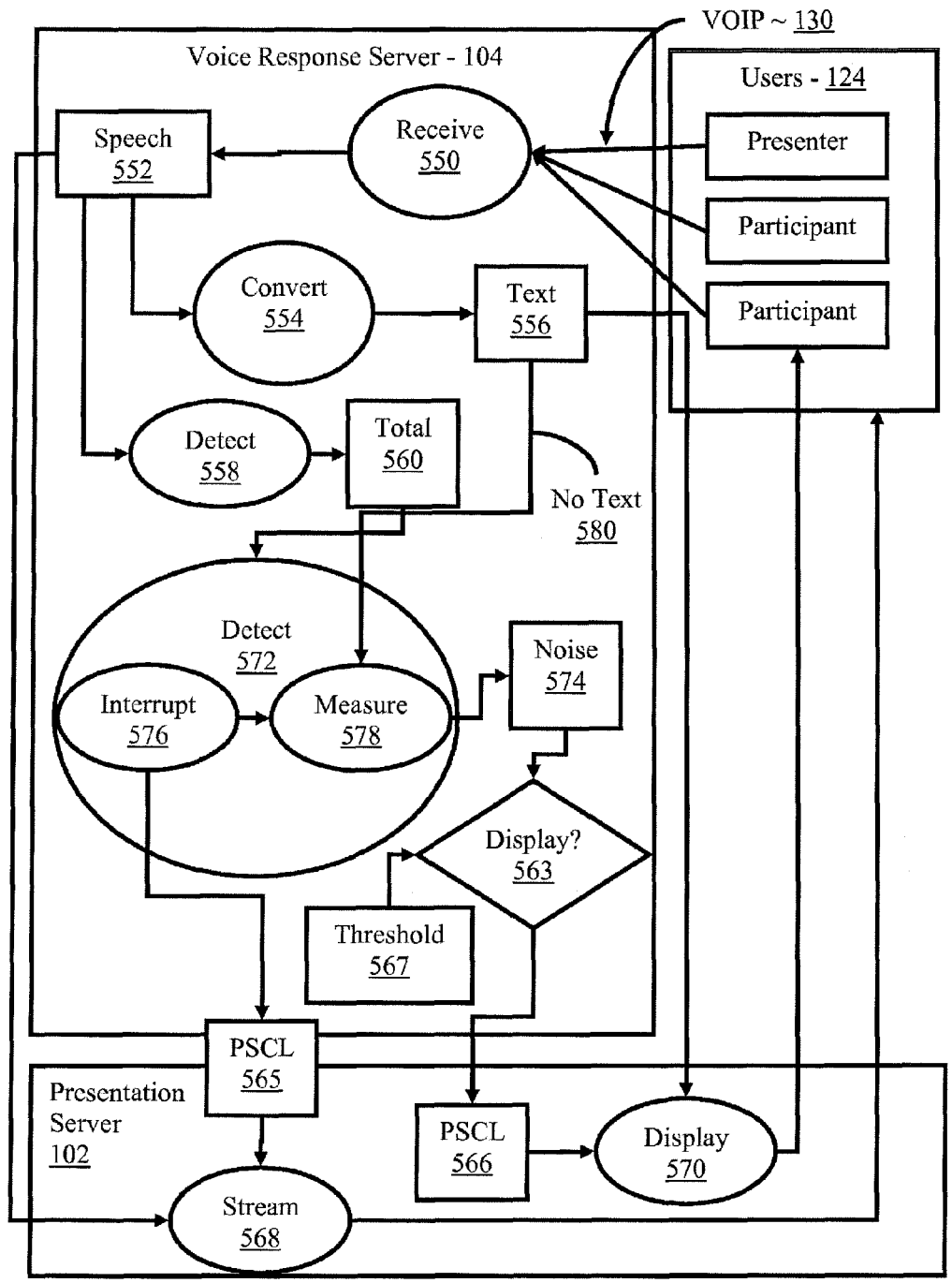
FIG. 20 is a data flow diagram illustrating a still further exemplary method for differential dynamic content delivery.

FIG. 20 is a data flow diagram illustrating an exemplary method for differential dynamic content delivery wherein the total sound level (560) for the user includes ambient noise. Ambient noise is background noise in the user's surrounding without the primary sound of the streaming speech of the presentation. In terms of traditional signal to noise analysis, the speech is the signal and noise is the ambient noise in a user's workstation environment. Said differently, ambient noise is the sound received by a user's microphone when there is no streaming speech from the presentation and the user is not speaking. Examples of ambient noise include street traffic, noise from surrounding office workers, noise from air conditioners and other equipment in the room with the user, as well as any other ambient noise as will occur to those of skill in the art.

The method of FIG. 20 includes detecting (572) an ambient noise level (574) for a user. In the method of FIG. 20, detecting (572) an ambient noise level for a user includes temporarily interrupting (576) speech streaming (568) to the user and measuring (578) a sound level on the user's voice channel during the interruption and while the user is not speaking (580). Measuring (578) the sound level is taking the sound level on a user's channel when streaming speech is interrupted and the user is not speaking. In this example, measuring a sound level on the user's voice channel advantageously is carried out while the user is not speaking because the user's speech would typically be included as part of the streaming speech, therefore comprising signal rather than noise. In the example of FIG. 20, interrupting (576) streaming speech is carried out by use of a presentation session control language instruction (565) from voice response server (104) to presentation server (102), and the fact that the user is not speaking is represented by detecting an absence of text (580) converted from the user's speech. The example of FIG. 20 includes several data communications channels represented as VOIP channels (130), one for each workstation of a user participant or presenter (124). This is one exemplary way of detecting an ambient noise level for a user. Other ways of detecting ambient noise levels for user will occur to those of skill in the art, and all such ways are well within the scope of the present invention.

In the method of FIG. 20, determining whether to display the text in dependence upon the total sound level for the user (reference 562 on FIG. 19) is carried out by determining (563) to display (570) the text to the user if the ambient noise level (574) is above a predetermined threshold (567). That is, if the total sound level (574) when only ambient noise is present exceeds a predetermined threshold, the method of FIG. 20 proceeds by sending a presentation control language instruction (566) to presentation server (102) to display (570) text (556).

Figure 21:
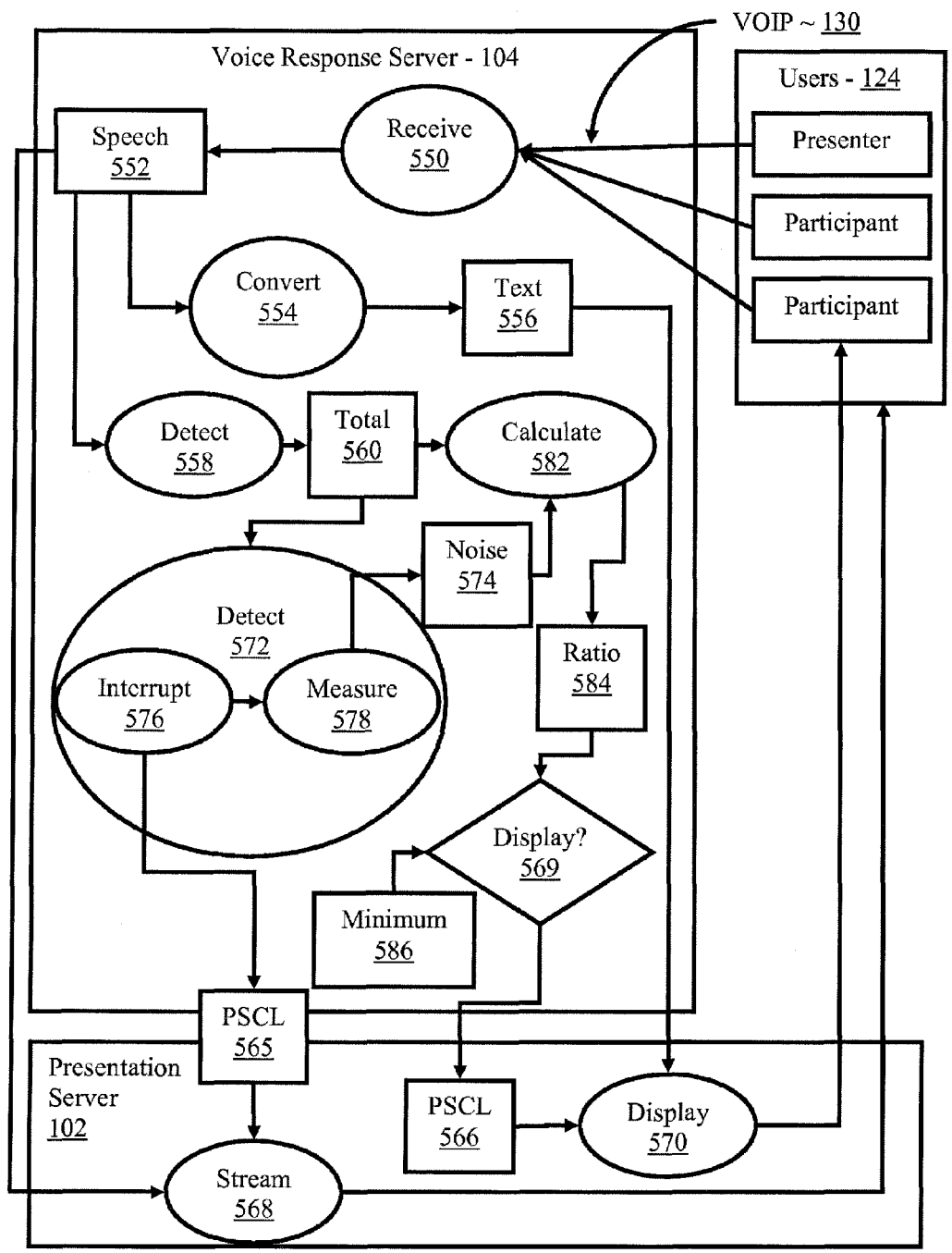
FIG. 21 sets forth a data flow diagram illustrating an exemplary method for differential content delivery where a total sound level comprises streaming speech plus ambient noise.

FIG. 21 sets forth a data flow diagram illustrating an exemplary method for differential content delivery where the total sound level (560) comprises streaming speech (552) plus ambient noise (574). As described above, ambient noise is measured (578) with streaming speech (568) interrupted (576) and preferably when a user whose noise level is being measured is not speaking (reference 580 on FIG. 20). In the method of FIG. 21, determining (562 on FIG. 19) whether to display the text is carried out by determining (569) whether to display the text in dependence upon a ratio (584) of the total sound level (560) to the ambient noise level (574). In the method of FIG. 21, a ratio (584) is calculated (582) by comparing the measured levels of total sound for a user workstation environment when streamed speech, and possibly a user's speech, is present (560) to an ambient noise level (574) detected (572) with streaming speech interrupted and the user not speaking. The method of FIG. 21 includes displaying (570) the text if the ratio (584) of the total sound level (560) to the ambient noise level (574) is less than a predetermined minimum (586).

Displaying Text in Dependence Upon Simultaneous Speech from Two or More Users

Figure 22:
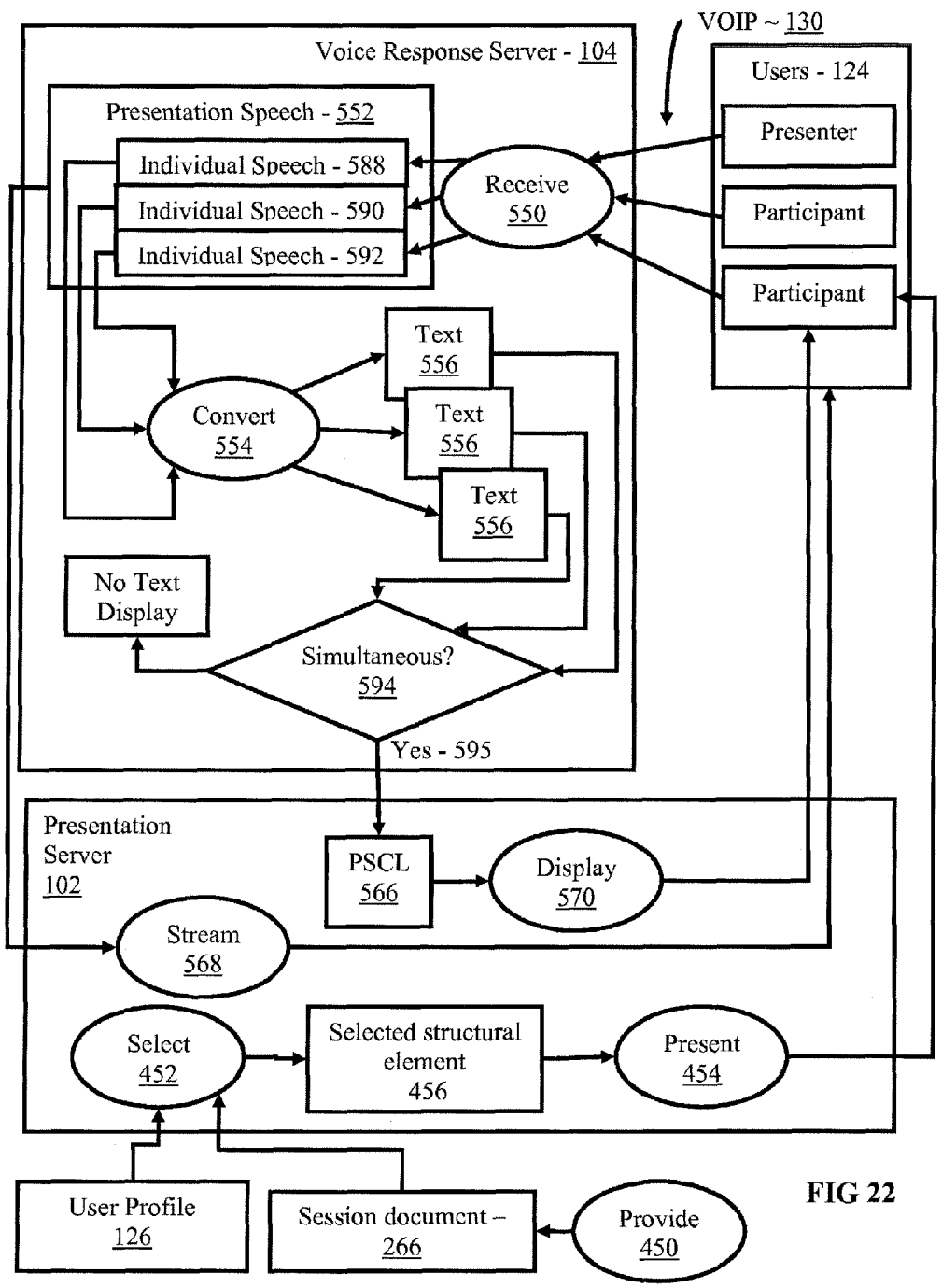
FIG. 22 sets forth a data flow diagram illustrating another exemplary method for differential dynamic content delivery.

FIG. 22 sets forth a data flow diagram illustrating an exemplary method for differential dynamic content delivery that includes providing to a multiplicity of users a presentation including content from a session document. Providing to a multiplicity of users a presentation including content from a session document is carried out in the method of FIG. 22 by providing (450) a session document (266) for a presentation, where the session document (266) includes a session grammar and a session structured document; by selecting (452) from the session structured document a classified structural element (456) in dependence upon user classifications of a user participant in the presentation; and by presenting (454) the selected structural element (456) to the user.

As noted, providing to a multiplicity of users a presentation including content from a session document in the method of FIG. 22 includes providing (450) a session document (266) for a presentation, where the session document (266) includes a session grammar and a session structured document. In the method of FIG. 22, the session document (266) includes a session grammar and a session structured document as shown at references (256) and (258) on FIG. 18, and providing (450) a session document (266) for a presentation is carried out by creating a session document from a presentation document as described in detail above in this specification, particularly in the discussion of the method exemplified in FIG. 16.

As noted, providing to a multiplicity of users a presentation including content from a session document in the method of FIG. 22 includes selecting (452) from the session structured document a classified structural element (456) in dependence upon user classifications of a user participant in the presentation. In the method of FIG. 22, selecting (452) a classified structural element (456) is carried out, as described above in the discussion of FIG. 18, by selecting a classified structural element (402 on FIG. 18) in dependence upon a presentation action identifier (518 on FIG. 18) and parameters (520 on FIG. 18) from a presentation control instruction (460 on FIG. 18).

As noted, providing to a multiplicity of users a presentation including content from a session document in the method of FIG. 22 includes presenting (454) the selected structural element (456) to the user. As disclosed above in the discussion of the method of FIG. 18, presenting (454) a selected structural element (456) to a user may be carried out, for example, by selecting a data communications protocol for the presentation, inserting the selected structural element (without its classification identifiers) in a data structure appropriate to the data communications protocol, and transmitting the data structure to the user according to the data communications protocol. Examples of useful data communications protocols useful with various embodiments of the present invention include HTTP, SIP, RTSP, and RTP.

The method of FIG. 22 includes streaming (568) presentation speech (552) to the user including individual speech (558, 590, 592) from at least one user participating in the presentation. Speech may be streamed to user over TCP/IP, through RTSP, or otherwise as will occur to those of skill in the art. The method of FIG. 22 includes converting (554) the presentation speech to text (556). Converting speech to text may be carried out by use of an off-the-shelf speech to text converter such as the ViaVoice™ products from IBM, the Dragon NaturallySpeaking products available from Scansoft, Inc., of Peabody, Mass., and others as will occur to those of skill in the art.

The method of FIG. 22 includes detecting (594) whether the presentation speech contains simultaneous individual speech from two or more users. In the example of FIG. 22, voice response server (104) receives (550) individual speech from users (124) on separate VOIP channels (130) through which users (124) are connected for data communications through voice response server (104) to presentation server (102). Each VOIP channel (130) takes as its input a signal gathered from a microphone in a user's workstation environment. In the example of FIG. 22, simultaneous individual speech from two or more users is indicated by the presence of text (556) in the output of speech to text conversion (554) for two or more user channels. When simultaneous speech is detected (595), in this example, a presentation control instruction (566) is sent to the presentation server (102) instructing the presentation server to display the text (556). That is, in some cases, in speech streamed (568) from all participants to all participants, when two or more users are speaking at the same time, users may not be able to adequately hear the streaming speech of the presentation. Displaying the text converted from speech enables all user participants advantageously to follow the presentation even when simultaneous speech is jumbled or confused.

Figure 23:
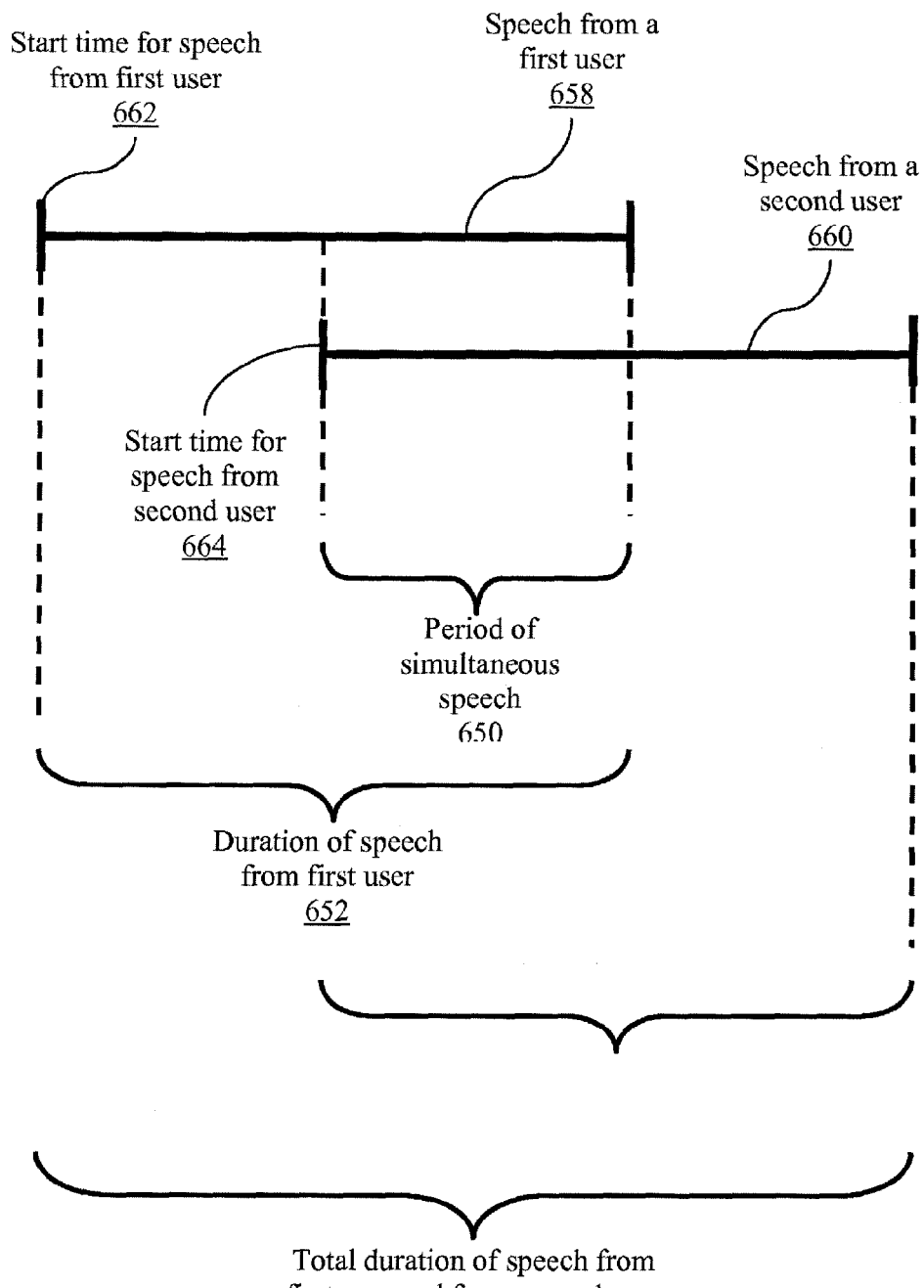
FIG. 23 sets forth a line drawing illustrating a period of simultaneous speech from a first user and a second user.

FIG. 23 sets forth a line drawing illustrating a period of simultaneous speech from a first user and a second user. FIG. 23 is used with reference to FIG. 22 to explain an exemplary method of differential dynamic content delivery that includes identifying a period of simultaneous speech if presentation speech (552) contains simultaneous individual speech (588) from two or more users (124), where displaying (570) the text is carried out by displaying presentation text for a presentation period longer than the period of simultaneous speech. In this example, detecting whether presentation speech contains simultaneous individual speech from two or more users includes determining whether a period of individual speech from a first user overlaps with a period of individual speech from another user.

FIG. 23 is used with reference to FIG. 22 to explain an exemplary method of differential dynamic content delivery where presentation speech (552) contains simultaneous individual speech (588) from two or more users (124), and the method includes identifying a period of simultaneous speech. In this exemplary method, detecting whether the presentation speech contains simultaneous speech from two or more users is carried out by determining whether a period of individual speech from a first user overlaps a period of individual speech from another user. FIG. 23 shows an individual speech from a first user (658) that overlaps individual speech from a second user (660). The individual speech from the second user (660) is shown overlapping the individual speech from the first user (658) in that the start time for the individual speech from the second user (664) occurs during the duration of the individual speech from the first user (652). The period of simultaneous speech (650) is identified as the portion of the duration of the individual speech from the first user (652) after the start time for the individual speech from the second user (664).

Start times (662, 664) for individual user speech may be derived from RTSP messages, by tracking text message arrival time in a presentation server (104), or by other means as will occur to those of skill in the art. Durations (652, 654) for individual user speech may be derived from RTSP messages, by inferring duration based upon word or other measures of text length, or by other means as will occur to those of skill in the art.

When simultaneous speech is present (595), displaying (570) the text may include displaying presentation text for a presentation period longer than the period of simultaneous speech (650). Displaying presentation text for a presentation period longer than the period of simultaneous speech (650) may be carried out by displaying presentation text for the total duration of individual speech from a first user and individual speech from a second user (656), including the period of simultaneous speech (650). Alternatively, displaying presentation text for a presentation period longer than the period of simultaneous speech (650) may be carried out by displaying presentation text for the duration of individual speech from a first user (652), including the period of simultaneous speech (650). Alternatively, displaying presentation text for a presentation period longer than the period of simultaneous speech (650) may be carried out by displaying presentation text for the duration of individual speech from a second user (654), including the period of simultaneous speech (650). All of these methods of displaying presentation text for a presentation period longer than the period of simultaneous speech (650) provide the clarifying advantage of displaying additional textual presentation context beyond merely the period of simultaneous speech.

The method of FIG. 22 includes displaying (470) text (556) if presentation speech contains simultaneous individual speech from two or more users. In the method of FIG. 22, displaying (470) the text further comprises segregating display text. Segregating display text typically includes segregating display text according to channel. One way of segregating the display text includes providing a display area for each channel transmitting speech from a user to the voice response server. In such an example, each display area displays the text converted from individual speech transmitted through the associated channel:

Ch. 1: "Jim and I are speaking simultaneously."
Ch. 2: "Harold and I are speaking simultaneously."

To provide further clarity a user may be registered with the channel allowing the display of a user name with or instead of a channel ID. For clarity the following exemplary display includes both a channel ID and a user name associated with that channel ID. simultaneously:

Channel 1/Harold: "Jim and I are simultaneously speaking."

Channel 2/Jim: "Harold and I are simultaneously speaking."

Alternatively, when a particular user is identified with a particular channel, the channel identification may be omitted:

Harold: "Jim and I are simultaneously speaking."

Jim: "Harold and I are simultaneously speaking."

In the example just above, it is implicit that individual user speech from channel 1 is identified as the speech of a user named. Harold and channel 2 presents Jim's individual user speech. In such an example, without voice recognition, the speech of any user present at Harold's workstation will be represented as Harold's speech—and the same for Jim—thus rendering ambiguous an identification of text with a user name.

In embodiments of the present invention that use voice recognition, however, multiple users can be present at the same workstation, and identifications of text with user names are still unambiguous. More than one user participant can participate in a presentation using a single workstation and speaking into a single microphone. Using voice recognition systems, display text further comprises segregating display text according to user and displaying the segregated text in a display area associated with the user speaking. Voice recognition software installed on the voice response server typically identifies the user speaking and associates a user name with text. The following example includes a channel identification to illustrate that two users are participating over a single channel, channel 1:

Ch. 1, Harold: "Jim, Ralph, and I are speaking simultaneously."

Ch. 1, Ralph: "Jim, Harold and I are speaking simultaneously."

Ch. 2, Jim: "Harold, Ralph and I are speaking simultaneously."

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims

What is claimed is:

1. A method for differential dynamic content delivery, the method comprising:
    providing to a multiplicity of users a presentation including content from a session document;
    streaming presentation speech to the user including individual speech from at least one user participating in the presentation;
    converting the presentation speech to text;
    detecting whether the presentation speech contains simultaneous individual speech from two or more users; and
    displaying the text if the presentation speech contains simultaneous individual speech from two or more users.

2. The method of claim 1 wherein the presentation speech contains simultaneous individual speech from two or more users, the method includes identifying a period of simultaneous speech, and displaying the text includes displaying presentation text for a presentation period longer than the period of simultaneous speech.

3. The method of claim 1 wherein detecting whether the presentation speech contains simultaneous speech from two or more users further comprises determining whether a period of individual speech from a first user overlaps a period of individual speech from another user.

4. The method of claim 1 wherein displaying the text further comprises segregating display text.

5. The method of claim 2 wherein segregating display text further comprises segregating display text according to channel.

6. The method of claim 2 wherein segregating display text further comprises segregating display text according to user.

7. The method of claim 1 wherein providing to a multiplicity of users a presentation including content from a session document further comprises: providing a session document for the presentation, wherein the session document includes a session grammar and a session structured document;
    selecting from the session structured document a classified structural element in dependence upon user classifications of a user participant in the presentation; and presenting the selected structural element to the user.

8. The method of claim 7 wherein selecting a classified structural element further comprises selecting a classified structural element having an associated classification identifier that corresponds to the user classification.

9. The method of claim 7 further comprising creating a session document from a presentation document, including:
    identifying a presentation document for a presentation, the presentation document including a presentation grammar and a structured document having structural elements classified with classification identifiers;
    identifying a user participant for the presentation, the user having a user profile comprising user classifications; and
    filtering the structured document in dependence upon the user classifications and the classification identifiers.

10. The method of claim 9 further comprising filtering the presentation grammar, in dependence upon the extracted structural elements, into a session grammar in the session document.

11. The method of claim 9 further comprising creating a presentation document, including:
    creating, in dependence upon an original document, a structured document comprising one or more structural elements;
    classifying a structural element of the structured document according to a presentation attribute; and
    creating a presentation grammar for the structured document, wherein the presentation grammar for the structured document includes grammar elements each of which includes an identifier for at least one structural element of the structured document.

12. The method of claim 11 wherein classifying a structural element comprises:
    identifying a presentation attribute for the structural element;
    identifying a classification identifier in dependence upon the presentation attribute; and
    inserting the classification identifier in association with the structural element in the structured document.

13. The method of claim 11 wherein creating a presentation grammar for the structured document comprises:
    identifying the content type of the original document;
    selecting, in dependence upon the content type, a full presentation grammar from among a multiplicity of full presentation grammars; and
    filtering the full presentation grammar into a presentation grammar for the structured document in dependence upon the structural elements of the structured document.

14. The system of claim 13 wherein the presentation speech contains simultaneous individual speech from two or more users, the system includes means for identifying a period of simultaneous speech, and means for displaying the text includes means for displaying presentation text for a presentation period longer than the period of simultaneous speech.

15. The system of claim 13 wherein means for detecting whether the presentation speech contains simultaneous speech from two or more users further comprises means for determining whether a period of individual speech from a first user overlaps a period of individual speech from another user.

16. The system of claim 13 wherein means for displaying the text further comprises means for segregating display text.

17. A system for differential dynamic content delivery, the system comprising:
  means for providing to a multiplicity of users a presentation including content from a session document;
  means for streaming presentation speech to the user including individual speech from at least one user participating in the presentation;
  means for converting the presentation speech to text;
  means for detecting whether the presentation speech contains simultaneous individual speech from two or more users; and
  means for displaying the text if the presentation speech contains simultaneous individual speech from two or more users.

18. The system of claim 17 wherein means for segregating display text further comprises means for segregating display text according to channel.

19. The system of claim 17 wherein means for segregating display text further comprises means for segregating display text according to user.

20. The system of claim 17 wherein means for providing to a multiplicity of users a presentation including content from a session document further comprises:
  means for providing a session document for the presentation, wherein the session document includes a session grammar and a session structured document;
  means for selecting from the session structured document a classified structural element in dependence upon user classifications of a user participant in the presentation; and
  means for presenting the selected structural element to the user.

* * * * *